US012678973B2

(12) United States Patent
Huang et al.

(10) Patent No.: US 12,678,973 B2
(45) Date of Patent: Jul. 14, 2026

(54) ROBOT BLADE FOR WAFERS AND WORKPIECES AND THIN WAFERS AND WORKPIECES

(71) Applicant: Taiwan Semiconductor Manufacturing Co., Ltd., Hsinchu (TW)

(72) Inventors: Hsin-Kai Huang, Hsinchu (TW); Kuei-Hsiung Cho, Hsinchu (TW); Fu-Kuo Tseng, Hsinchu (TW); Chun-Jen Chan, Hsinchu (TW); Chun Yan Chen, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 328 days.

(21) Appl. No.: 18/486,010

(22) Filed: Oct. 12, 2023

(65) Prior Publication Data

US 2025/0121507 A1    Apr. 17, 2025

(51) Int. Cl.
*B25J 15/00*        (2006.01)
*B25J 11/00*        (2006.01)
B25J 13/08        (2006.01)

(52) U.S. Cl.
CPC ....... *B25J 15/0014* (2013.01); *B25J 11/0095* (2013.01); *B25J 13/08* (2013.01)

(58) Field of Classification Search
None
See application file for complete search history.

(56) References Cited

U.S. PATENT DOCUMENTS

| | | | | | |
|---|---|---|---|---|---|
| 6,077,026 | A | * | 6/2000 | Shultz | .............. H01L 21/68707 414/744.1 |
| 6,256,555 | B1 | * | 7/2001 | Bacchi | ............... H01L 21/6838 700/262 |
| 6,712,579 | B2 | * | 3/2004 | Fujii | ................ H01L 21/68707 414/744.5 |
| 7,334,826 | B2 | * | 2/2008 | Woodruff | ......... H01L 21/68707 414/941 |
| 7,641,247 | B2 | * | 1/2010 | Blonigan | ......... H01L 21/68707 294/902 |
| 8,141,926 | B2 | * | 3/2012 | Fujii | ................ H01L 21/67742 414/941 |

(Continued)

*Primary Examiner* — Michael S Lowe
(74) *Attorney, Agent, or Firm* — Seed IP Law Group

(57)        ABSTRACT

A cross-shape transfer blade is configured to, in operation, be mounted or coupled to an end of a transfer robot arm (TRA). The cross-shape robot or transfer blade includes a plurality of raised regions to contact a backside of a workpiece or thin workpiece such that the cross-shape transfer blade supports and transports the respective workpiece between various locations within a semiconductor manufacturing plant (FAB). The cross-shape transfer blade includes a first prong structure, a second prong structure, a first wing structure, and a second wing structure. Respective ones of the plurality of raised regions are at corresponding ones of the first prong structure, the second prong structure, the first wing structure, and the second wing structure minimizing contact between the backside of the workpiece or thin workpiece and the cross-shape transfer blade when the workpiece or thin workpiece is being transferred, transported, and supported by the cross-shape transfer blade.

20 Claims, 31 Drawing Sheets

(56)        References Cited

U.S. PATENT DOCUMENTS

| 8,672,602 B2 * | 3/2014 | Asari ............... H01L 21/68707 |
| | | 414/160 |
| 9,434,076 B2 * | 9/2016 | Tseng .................. B25J 15/0014 |
| 2023/0091979 A1 * | 3/2023 | Dammura ......... H01L 21/67742 |
| | | 414/751.1 |

* cited by examiner

ROBOT BLADE FOR WAFERS AND WORKPIECES AND THIN WAFERS AND WORKPIECES

BACKGROUND

Generally, in the manufacture of semiconductor devices, robots are often utilized to transport, transfer, and support a workpiece, such a wafer or thin wafer, between various processing apparatuses, processing tools, or respective locations. In some system architectures, a workpiece carrier or transfer blade is mounted to an arm of a robot (e.g., a transfer arm robot (TRA)) that is configured to, in operation, pick up, support, and transport respective workpieces while transferring and transporting the respective workpieces between various processing apparatuses, processing tools, or respective locations.

For example, as discussed above, one common workpiece carrier includes a transfer or robot blade coupled to an end of the robot, wherein the workpiece rests on the transfer or robot blade during transportation thereof by the robot. Typically, gravity maintains the position of the workpiece with respect to the robot blade. As such, gravity applies forces (e.g., downward forces based on the orientation of the workpiece when resting on the transfer or robot blade) on the workpiece when the workpiece is being transported, transferred, and supported by the transfer or robot blade between respective locations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figures 1A, 1B:
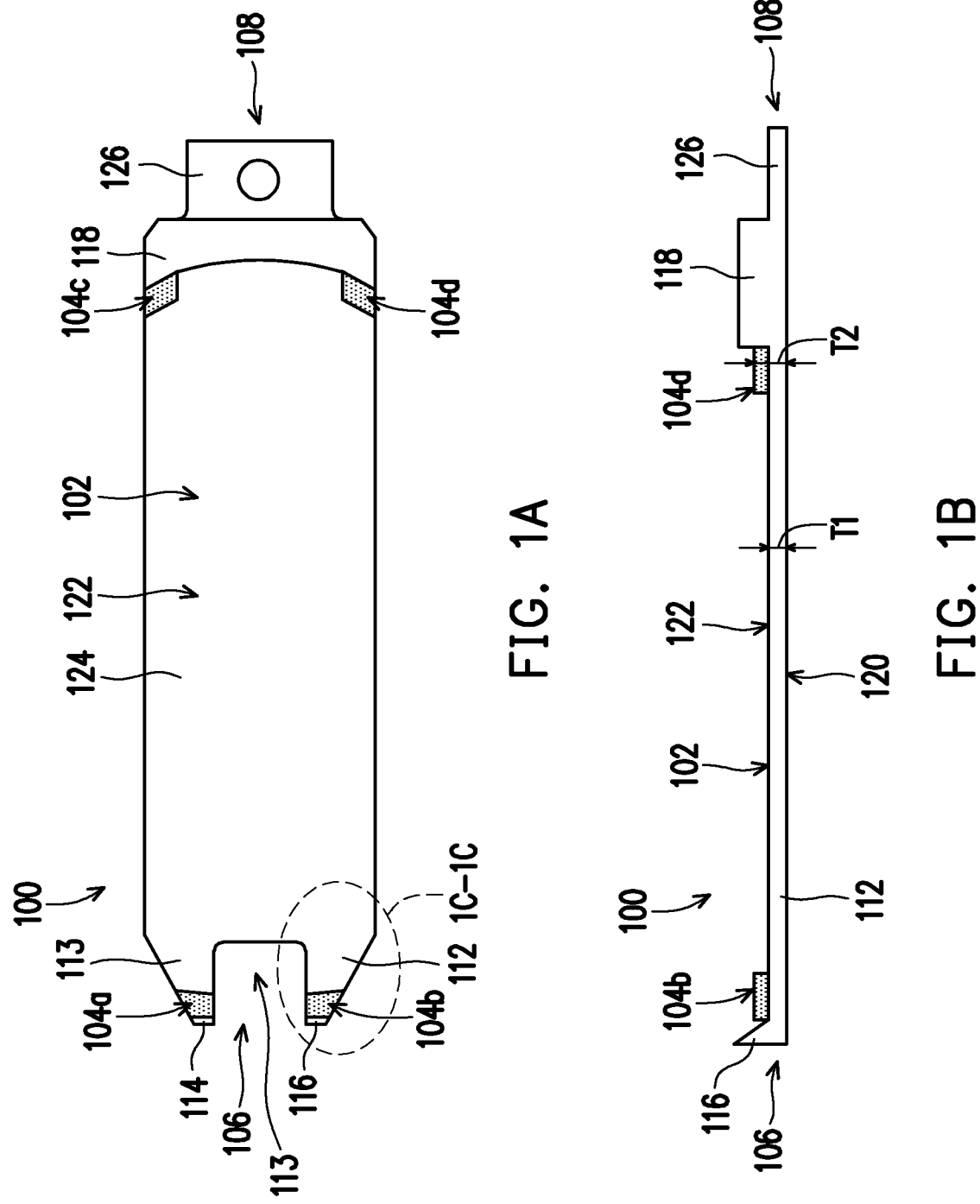
FIG. 1A is a top plan view of a robot or transfer blade.
FIG. 1B is a side view of the robot or transfer blade as shown in FIG. 1A.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a top plan view of a robot or transfer blade 100. FIG. 1B is a side view of the robot or transfer blade 100 as shown in FIG. 1A. A first side 102 of the transfer blade 100 includes a plurality of raised regions, protrusions, extensions, or surfaces 104a-104d at the first side 102. The plurality of raised regions 104a-104d includes a first raised region 104a, a second raised region 104b, a third raised region 104c, and a fourth raised region 104d. The first and second raised regions 104a, 104b are in closer proximity to a first end 106 of the transfer blade 100, and the third and fourth raised regions 104c, 104d are in closer proximity to a second end 108 of the transfer blade 100 opposite to the first end 106 of the transfer blade 100. The respective raised regions of the plurality of raised regions 104a-104d are configured to, in operation, come into contact with a backside or rear side of a workpiece, which may be a wafer or a thin wafer (see FIGS. 5A and 5B of the present disclosure). The transfer blade 100 further includes a first prong or finger structure 110 and a second prong or finger structure 112 that is spaced apart from the first prong 110 by a gap 113, which has a U-shape as shown in FIG. 1A. The first and second prong structures 110, 112 may be referred to as hooked structures or some other similar or like type of reference to the first and second prong structures 110, 112. The first raised region 104a is at and along the first prong 110, and the second raised region 104b is at and along the second prong 112. A first hooked portion or structure 114 is at a respective end of the first prong 110, and a second hooked portion or structure 116 is at a respective end of the second prong 112. A barrier portion or structure 118 is adjacent to the third raised region 104c and the fourth raised region 104d. The barrier structure 118 along with the first and second hooked structures 114, 116 are configured to, in operation, align a respective workpiece on the transfer blade 100. The transfer blade 100 includes a second side 120 opposite to the first side 102 (see FIG. 1B). As shown in FIG. 1B, the first side 102 is an upper side of the transfer blade 100 and the second side 120 is a lower side of the transfer blade 100.

A lower region or surface 122 of the transfer blade 100 extends between the first and second raised regions 104a, 104b to the third and fourth raised regions 104c, 104d. The lower region 122 is present such that a backside or rear side of a respective workpiece on the transfer blade 100 does not contact the lower region 122 and contacts the plurality of raised regions 104a-104d to minimize a contact area between the backside or rear side of the respective workpiece on the transfer blade 100. The lower region 122 extends continuously and unimpeded between the first, second, third, and fourth raised regions 104a, 104b, 104c, 104d.

The first prong 110 and the second prong 112 extend outward from a main body portion or structure 124 of the transfer blade 100. The main body 124 extends from the first prong 110 and the second prong 112 to the barrier structure 118.

The transfer blade 100 further includes a mounting end portion or structure 126 that is configured to, in operation, be utilized to mount or to couple the transfer blade 100 to a robot. For example, the robot may be a transfer robot arm (TRA) that is utilized for moving or articulating the transfer blade 100 when mounted to the TRA. In other words, when the transfer blade 100 is mounted to the TRA, the transfer blade 100 is an end effector of the TRA that is configured to, in operation, transfer and transport respective workpieces between respective various locations such as within a semiconductor manufacturing plant (FAB), within a processing tool or apparatus, between processing tools or apparatuses, or some other similar or like type of respective various locations for processing and refining of the respective workpieces.

As shown in FIG. 1B, the transfer blade 100 has a first thickness T1 that extends from the first side 102 to the second side 120 of the transfer blade 100, and a second thickness T2 that extends from the second side 120 to a corresponding one of the plurality of raised regions 104a-104d. The first thickness T1 may be within the range of 1.0 to 1.2 millimeters (mm) or may be equal to the upper and lower ends of this range. The second thickness T2 may be within the range of 1.5 to 1.8 millimeters (mm) or may be equal to the upper and lower ends of this range The second thickness T2 is greater than the first thickness T1.

Thicknesses of the first and second hooked structures 114, 116, which extend from the second side 120 to respective uppermost points of the first and second hooked structures 114, 116, may be equal to 2.3 millimeters (mm).

Figure 2A:
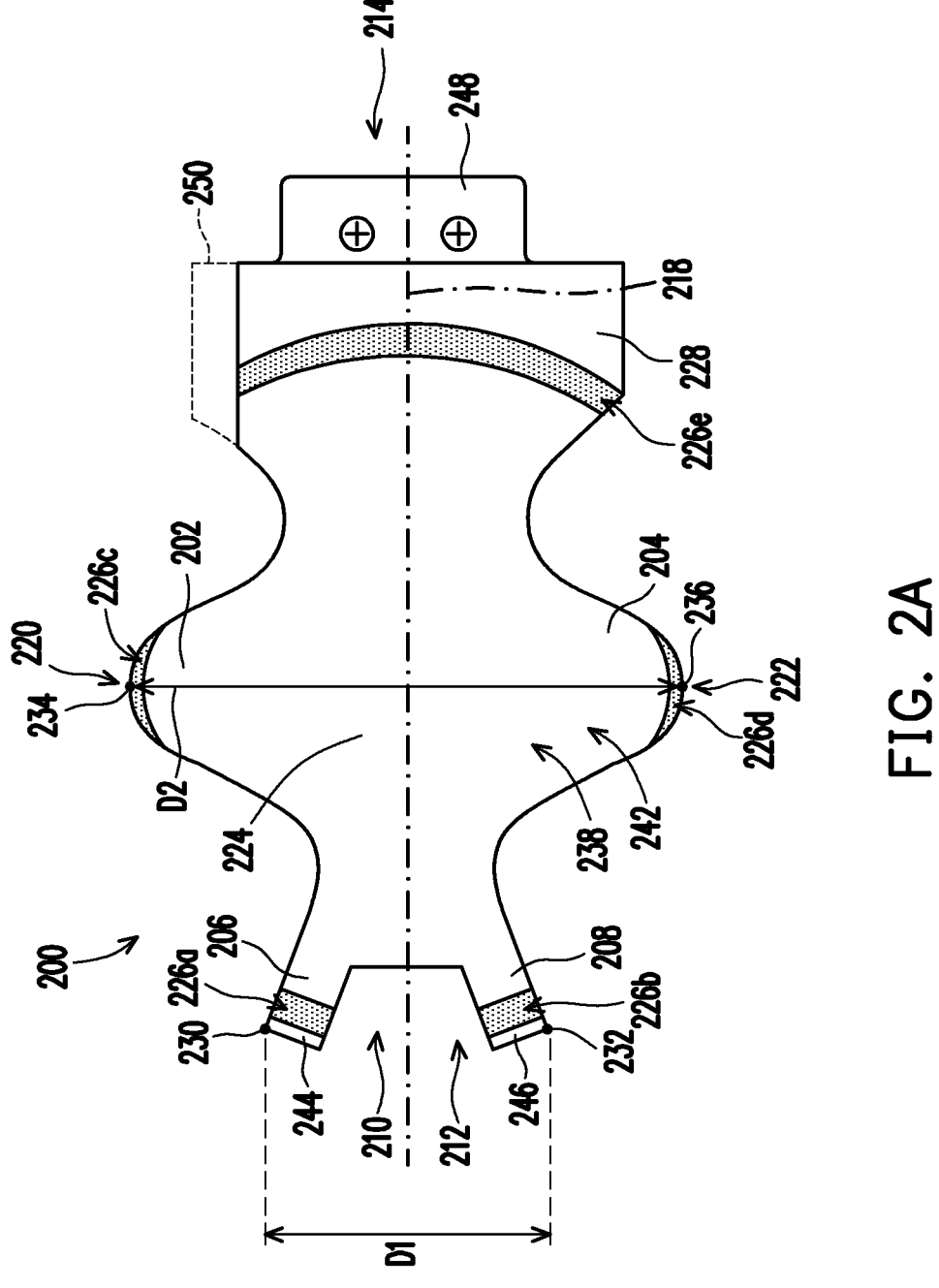
FIG. 2A is a top plan view of a cross-shape robot or transfer blade, in accordance with some embodiments.
Figure 2B:
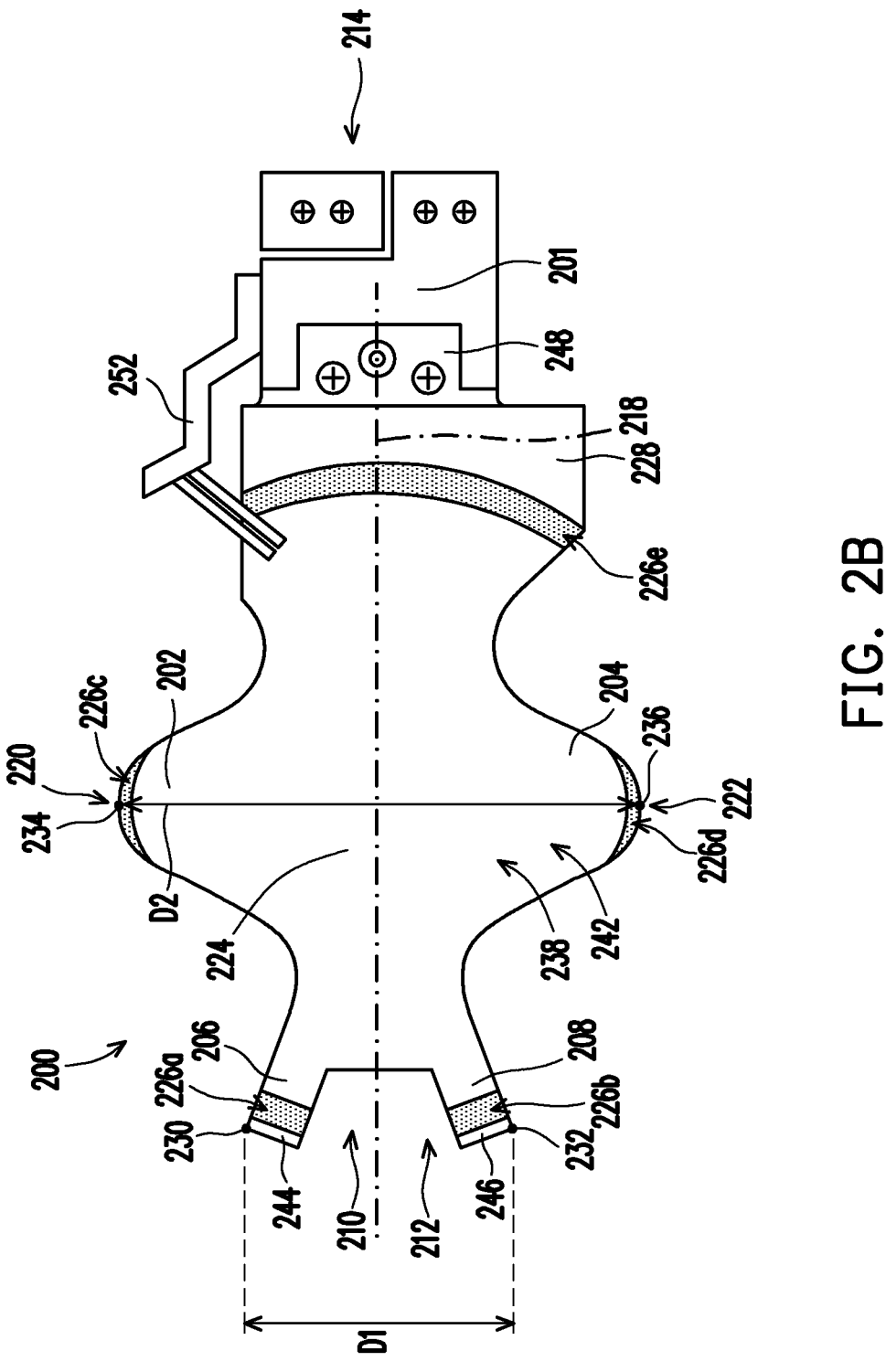
FIG. 2B is a top plan view of the cross-shape robot or transfer blade as shown in FIG. 2A mounted or coupled to a transfer robot arm (TRA), in accordance with some embodiments.
Figure 2C:
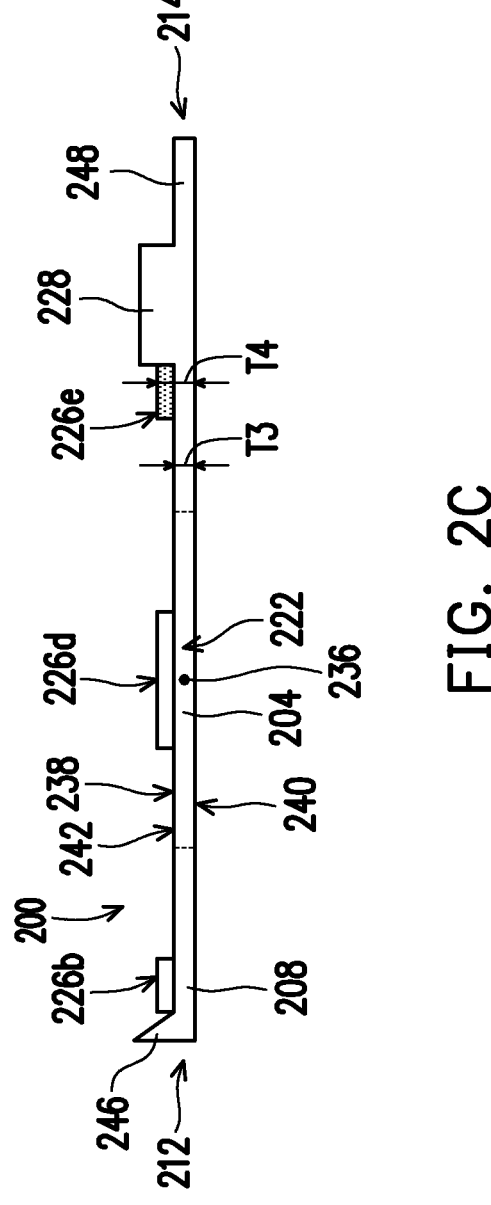
FIG. 2C is a side view of the cross-shape robot or transfer blade as shown in FIG. 2A, in accordance with some embodiments.
Figure 2D:
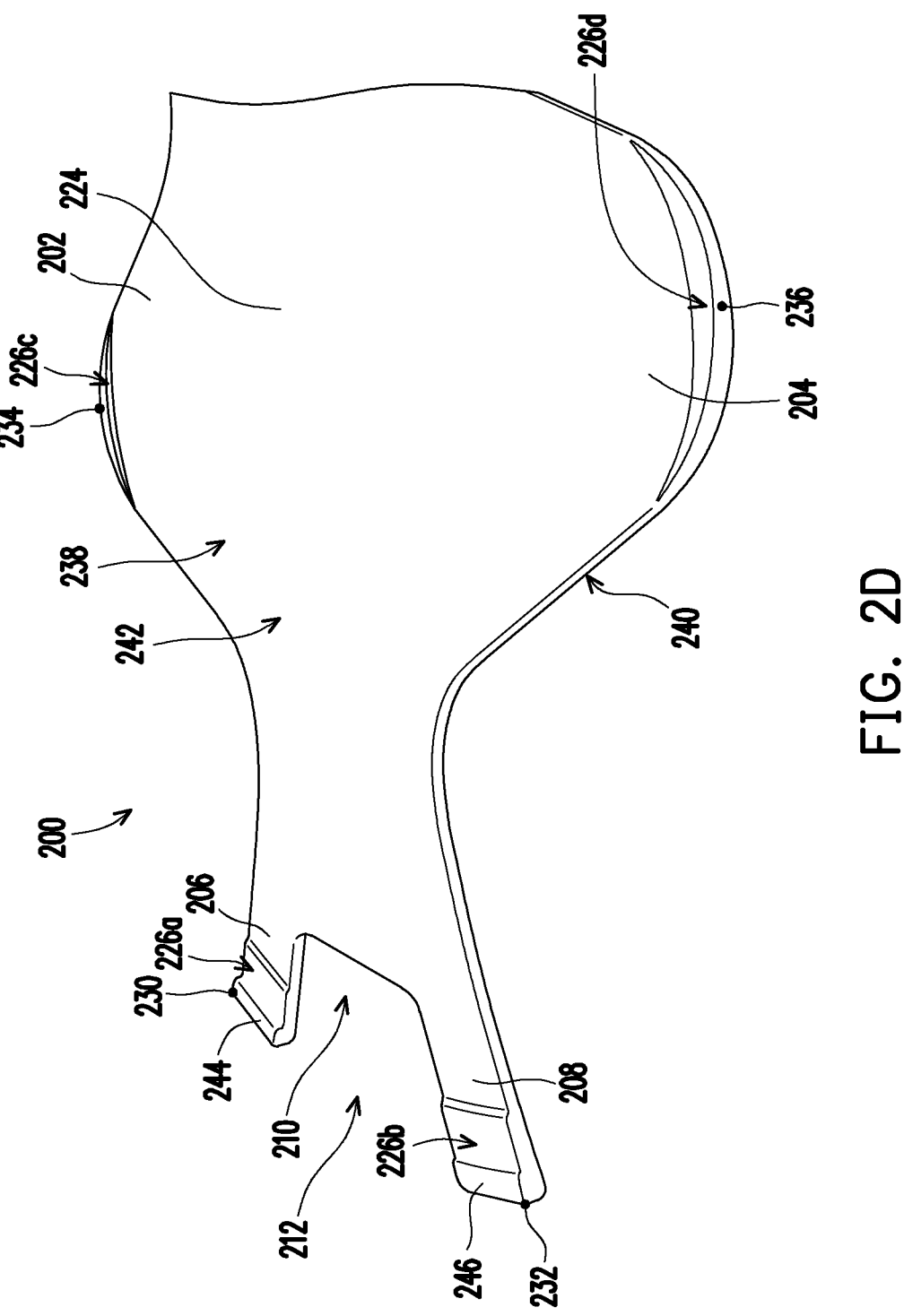
FIG. 2D is zoomed in, enhanced view of the cross-shape robot or transfer blade as shown in FIGS. 2A-2C, in accordance with some embodiments.

FIG. 2A is a top plan view of a cross-shape transfer blade 200 with a first wing structure 202 and a second wing structure 204, in accordance with some embodiments. FIG. 2B is a top plan view of the cross-shape transfer blade 200 mounted to a mounting structure 201, which, for example, may be at an end of a transfer arm robot (TRA) that transfers, transports, and supports respective workpieces between various respective locations. FIG. 2C is a side plan view of the cross-shape transfer blade 200, in accordance with some embodiments. FIG. 2D is a zoomed in, enhanced perspective view of the cross-shape transfer blade 200, in accordance with some embodiments. As will become readily apparent in view of the further discussion herein, utilizing the transfer blade 100 to transfer thin workpieces (e.g., thin wafers made of silicon) may have an increased likelihood of defects or damage propagating within the thin workpieces or along respective surfaces of the thin workpieces, whereas utilizing the cross-shape transfer blade 200 with the first and second wing structures 202, 204 instead of the transfer blade 100 to transfer, transport, and support thin wafers (e.g., thin wafers made of silicon) prevents or reduces the likelihood of defects or damage propagating within the thin workpieces or along respective surfaces of the thin workpieces. For example, see the discussion later herein with respect to at least FIGS. 5A, 5B, 6A-6C, 7A, 7B, 8A-8C, 9A, 9B, 10A-10C, 11A, 11B, and 12.

As shown in FIGS. 2A-2D, the cross-shape transfer blade 200 has a cross-shape. The cross-shape transfer blade 200 further includes a first prong or finger structure 206 and a second prong or finger structure 208 that is spaced apart from the first prong or finger structure 206 by a gap 210, which has a trapezoidal-like shape as shown in FIG. 2A. In some alternative embodiments, the gap 210 may have some other type of shape. The first and second prong structures 206, 208 and the gap 210 are at a first end 212 of the cross-shape transfer blade 200. Unlike the first and second prong structures 110, 112 of the transfer blade 100 that are relatively parallel with each other (see FIG. 1A of the present disclosure), the first and second prong structures 206, 208 are angled relative to each other (see FIG. 2A of the present disclosure). The cross-shape transfer blade 200 further includes a second end 214 that is opposite to the first end 212. The first and second prong structures 110, 112 being at an angle relative to each other further distributes forces of gravity across the cross-shape transfer blade 200 when a respective workpiece is present on the cross-shape transfer blade 200.

A mounting end portion or structure 248 is at the second end 214 of the cross-shape transfer blade 200. The mounting end portion 248 is configured to be coupled to, mounted to, or fastened to the mounting structure 201. For example, the mounting end portion 248 may be fastened to the mounting structure 201 by one or more fasteners (e.g., screws, nuts and bolts, etc.) such that the cross-shape transfer blade 200 may be removable fastened to the mounting structure 201 such that the cross-shape transfer blade 200 may be removed from the mounting structure 201 in case the cross-shape transfer blade 200 is to be replaced for cleaning or for replacement purposes.

A central-line axis 218 extends across the cross-shape transfer blade 200 at least as shown in FIGS. 2A and 2B. The mounting end portion 248 is symmetrical about a central-line axis 218, the first and second prong structures 206, 208 are mirrors of each other across the central-line axis 218, and the first and second wing structures 202, 204 are mirrors of each other across the central-line axis 218. In other words, the first and second prong structures 206, 208 and the first and second wing structures 202, 204 are symmetrical about the central-line axis 218.

The cross-shape transfer blade 200 further includes a first side 220 and a second side 222 that is opposite to the first side 220. The first side 220 and the second side 222 are opposite to each other about the central-line axis 218. When the cross-shape transfer blade 200 is viewed front on from the first end 212 of the cross-shape transfer blade 200, the first side 220 is at a left-hand side of the cross-shape transfer blade 200 and the second side 222 is at a right-hand side of the cross-shape transfer blade 200. When the cross-shape transfer blade 200 is viewed front on from the first end 212 of the cross-shape transfer blade 200, the first wing structure 202 is left-hand side of the cross-shape transfer blade 200 and the second wing structure 204 is at the right-hand side of the cross-shape transfer blade 200. The cross-shape transfer blade 200 further includes a main body 224 from which the first and second prong structures 206, 208 and the first and second wing structures 202, 204 extend outward.

The cross-shape transfer blade 200 further includes a plurality of raised regions, protrusions, extensions, or surfaces 226a, 226b, 226c, 226d, 226e. The plurality of raised regions 226a-226e includes a first raised region 226a at the first prong structure 206, a second raised region 226b at the second prong structure 208, a third raised region 226c at the first wing structure 202, a fourth raised region 226d at the second wing structure 204, and a fifth raised region 226e adjacent to a barrier portion or structure 228. The barrier structure 228 is configured to, in operation, act as a boundary such that a respective workpiece on the cross-shape transfer blade 200 is properly aligned and positioned with the plurality of raised regions 226a-226e such that the plurality of raised regions contacts a backside of the respective workpiece on the cross-shape transfer blade 200 when being transferred, transported, and supported by the cross-shape transfer blade 200.

The first and second raised regions 226a, 226b are in close proximity to the first end 212 of the transfer blade, the third and fourth raised regions 226c, 226d are at an intermediate location between the first end 212 and the second end 214 of the transfer blade, and the fifth raised region 226e is in closer proximity to the second end 214 of the cross-shape transfer blade 200 than the first end of the cross-shape transfer blade 200. The third, fourth, and fifth raised regions 226c, 226d, 226e are curved regions such that the third, fourth, and fifth raised regions 226c, 226d, 226e have a curved profile. For example, the third and fourth raised regions 226c, 226d have the curved profile as the first and second wing structures 202, 204 have a parabolic-like shape or profile at least as shown in FIGS. 2A and 2B of the present disclosure.

A first point 230 of the first prong structure 206 is a point of the first prong structure 206 furthest away from the second prong structure 208. A second point 232 of the second prong structure 208 is a point of the second prong structure 208 furthest away from the first prong structure 206. A first dimension D1 extends from the first point 230 to the second point 232.

A third point 234 of the first wing structure 202 is a point of the first wing structure 202 furthest away from the second wing structure 204. A fourth point 236 of the second wing structure 204 is a point of the second wing structure 204 furthest away from the first wing structure 202. A second dimension D2 extends from the third point 234 to the fourth point 236. The second dimension D2 is greater than the first dimension D1.

The cross-shape transfer blade 200 further includes a third side 238 and a fourth side 240 opposite to the third side (see FIG. 2C of the present disclosure) 238. When viewed front on from the first end 212 of the cross-shape transfer blade 200, the third side 238 is an upper side of the cross-shape transfer blade 200 and the fourth side is a lower side of the cross-shape transfer blade 200. The third side 238 is the side at which a respective workpiece is positioned or placed on the cross-shape transfer blade 200 when the cross-shape transfer blade 200 is being utilized to transfer, transport, and support the respective workpiece between respective various locations.

A lower region or surface 242 of the cross-shape transfer blade 200 extends between the first, second, and fifth raised regions 226a, 226b, 226e and extends between the third and fourth raised regions 226c, 226d. The lower region 242 is present such that a backside or a rear side of a respective workpiece on the cross-shape transfer blade 200 does not contact the lower region 242 and contacts the plurality of raised regions 226a-226e to minimize a contact area between the backside or rear side of the respective workpiece and the cross-shape transfer blade 200. The lower region 242 extends continuously and unimpeded between the first, second, third, fourth, and fifth raised regions 226a, 226b, 226c, 226d, 226e.

A first hooked portion or structure 244 is at a respective end of the first prong structure 206 at the first end 212, and a second hooked portion or structure 246 is at a respective end of the second prong structure 208 at the first end 212. The barrier structure 228 along with the first and second hooked structures 244, 246 are configured to, in operation, align a respective workpiece on the cross-shape transfer blade 200. The first and second prong structures 206, 208 may be referred to as first and second hooked prong structures or some other similar or like type of reference to the first and second prong structures 206, 208.

The cross-shape transfer blade 200 is asymmetrical in close proximity to the second end 214 at which the mounting end portion or structure 248 is present. The asymmetrical region of the cross-shape transfer blade 200 about the central-line axis 218 is represented by the dotted region 250 at least as shown in FIG. 2A of the present disclosure. This dotted region 250 provides clearance for a sensor 252 (see FIG. 2B of the present disclosure), which may be a fiber sensor, that detects whether a respective workpiece is or is not currently present on the cross-shape transfer blade 200. In view of the dotted region 250, the barrier structure 228 is asymmetrical about the central-line axis 218.

As shown in FIG. 2B, the mounting end structure 248 of the cross-shape transfer blade 200 is coupled to, mounted to, or fastened to the mounting structure 201. In other words, the mounting end structure 248 of the cross-shape transfer blade 200 is configured to, in operation, be utilized to mount the cross-shape transfer blade 200 to a robot. For example, the robot may be a transfer robot arm (TRA) that is utilized for moving or articulating the cross-shape transfer blade 200 when mounted to the TRA. In other words, when the cross-shape transfer blade 200 is mounted to the mounting structure 201 of the TRA, the cross-shape transfer blade 200 is an end effector of the TRA that is configured to, in operation, transfer respective workpieces between respective and various locations such as within a semiconductor manufacturing plant (FAB), within a processing tool or apparatus, between processing tools or apparatuses, or some other similar or like type of respective and various locations for processing and refinement of the respective workpieces.

As shown in FIG. 2C, the second wing structure 204 is positioned between dotted lines, which have been provided for representative purposes of the second wing structure 204 when viewed from the side as shown in FIG. 2C.

As shown in FIG. 2C, the cross-shape transfer blade 200 includes a third thickness T3 that extends from the third side 238 to the fourth side 240, and a fourth thickness T4 that extends from the fourth side to a corresponding one of the plurality of raised regions 226a-226e. The third thickness T3 is less than the first thickness T1, is less than the second thickness T2, and is less than the fourth thickness T4. The third thickness T3 may be within the range of 1.1 to 1.2 millimeters (mm) or may be equal to the upper and lower ends of this range, and the fourth thickness T4 may be within the range of 1.6 to 1.9 millimeters (mm) or may be equal to the upper and lower ends of this range.

Thicknesses of the first and second hooked structures 244, 246, which extend from the second side 120 to respective uppermost points of the first and second hooked structures 244, 246, may be equal to 2.3 millimeters (mm).

Figure 1C:
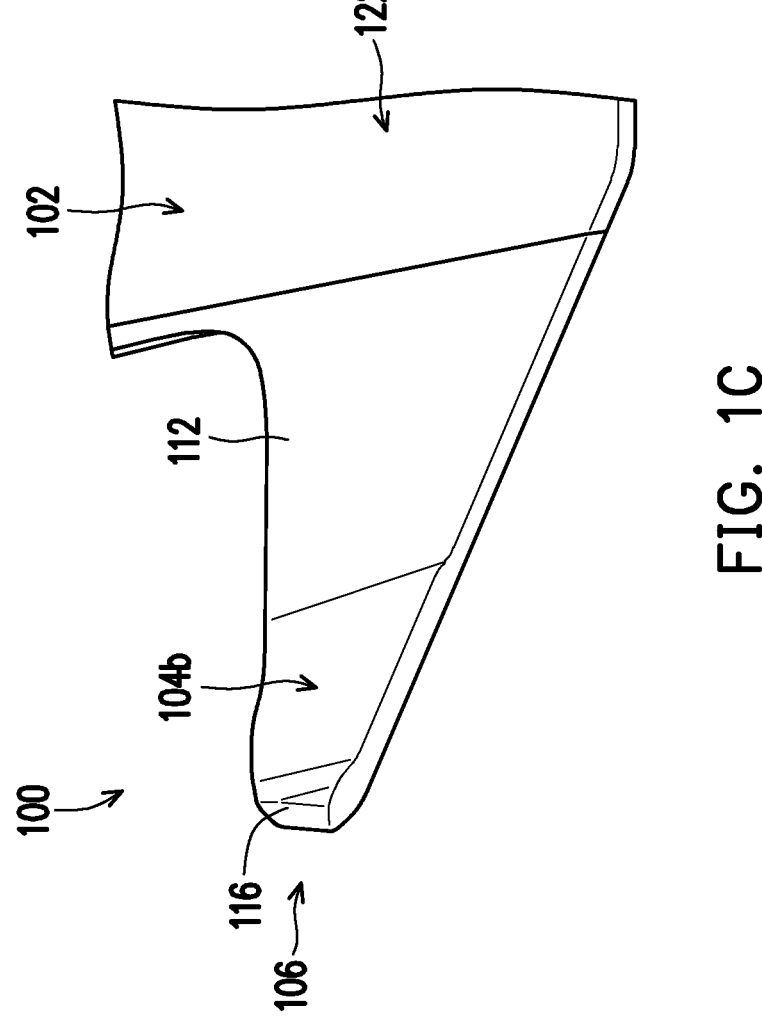
FIG. 1C is a zoomed, in enhanced view of section 1C-1C of the robot or transfer blade as shown in FIG. 1A.
Figure 3:
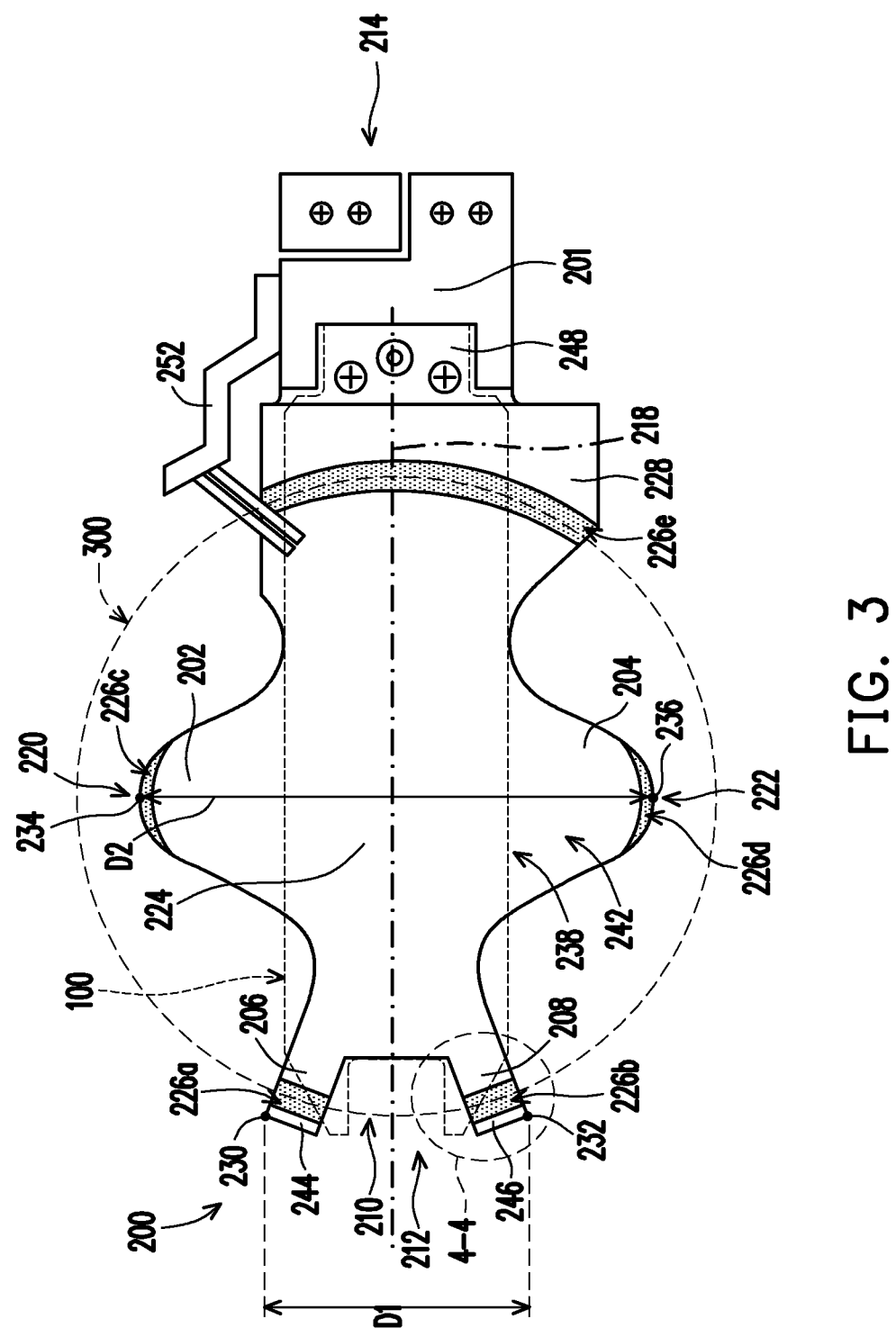
FIG. 3 is a top plan view of the robot or transfer blade as shown in FIGS. 1A-1C overlapped with the cross-shape robot or transfer blade as shown in FIGS. 2A-2D, in accordance with some embodiments, for comparison purposes.
Figure 4:
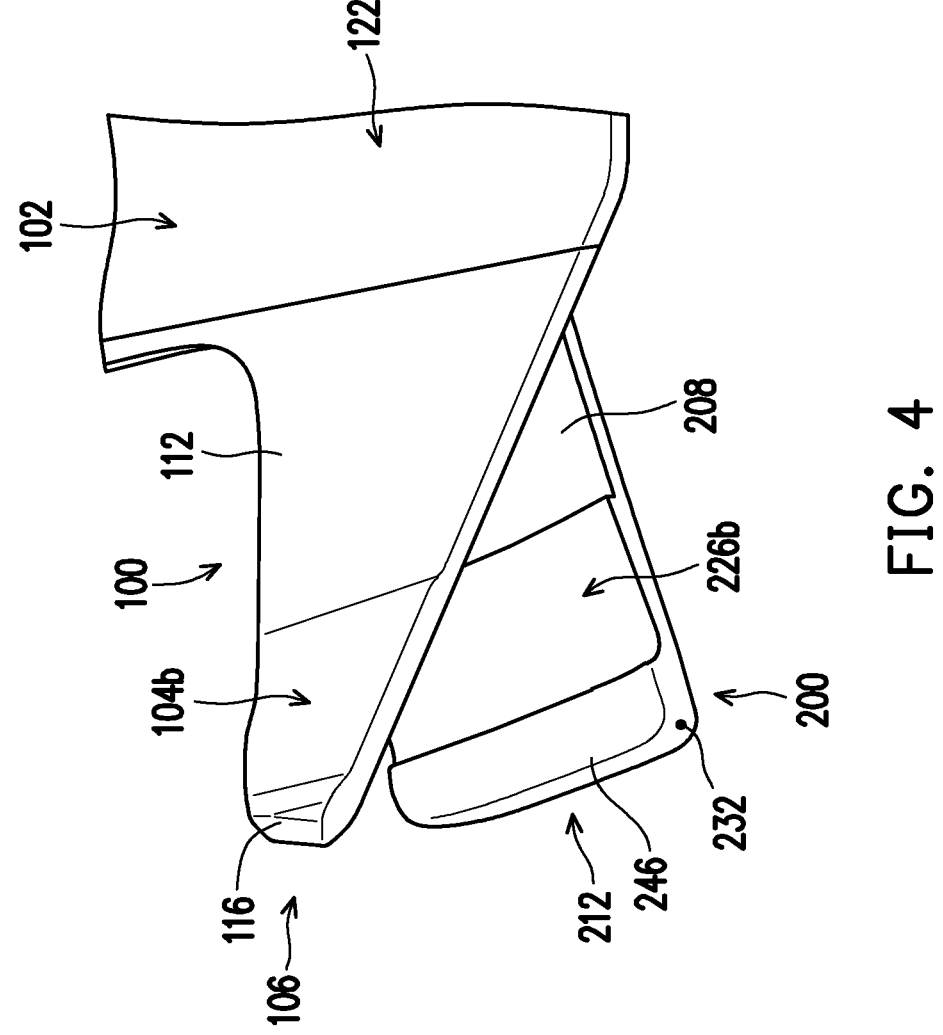
FIG. 4 is a zoomed in, enhanced view of section 4-4 as shown in FIG. 3 of the robot or transfer blade as shown in FIGS. 1A-1C overlapped with the cross-shape robot or transfer blade as shown in FIGS. 2A-2D, in accordance with some embodiments, for comparison purposes.

FIG. 3 is a top plan view of the cross-shape transfer blade 200 as shown in FIGS. 2A-2D, in accordance with some embodiments, overlapped by a dotted version of the transfer blade 100 as shown in FIGS. 1A-1C, as well as overlapped by a dotted version of a respective workpiece 300. FIG. 4 is a zoomed in, enhanced view of the second prong structure 208 of the cross-shape transfer blade 200, in accordance with some embodiments, with a zoomed in, enhanced view of the second prong structure 112 of the transfer blade 100 directly adjacent to the second prong structure 208 for comparison purposes.

As shown in FIG. 3, the workpiece 300 overlaps the plurality of raised regions 226a-226e of the cross-shape transfer blade 200 when the workpiece 300 is present on the cross-shape transfer blade 200. A backside or rear side of the workpiece 300 contacts the plurality of raised regions 226a-226e and does not contact the lower region 242 of the cross-shape transfer blade 200 to minimize the contact area between the backside of the workpiece 300 and the cross-shape transfer blade 200. Minimizing this contact area prevents or reduces the likelihood defects or damage (e.g., scratching, cracking, etc.) propagating at the backside of the workpiece 300 or within the workpiece 300, which may be a result of minor shifts in the position of the workpiece 300 on the cross-shape transfer blade 200 when being transferred, transported, and supported by the transfer blade 200 between various locations. Similarly, when the workpiece 300 is on the transfer blade 100, the backside of the workpiece 300 contacts the plurality of raised regions 104*a*-104*d* of the transfer blade 100, and, similarly, this is to minimize the contact area between the transfer blade 100 and the backside of the workpiece 300 to similarly prevent or reduce the likelihood of defects or damage (e.g., scratching, cracking, etc.) propagating at the backside of the workpiece 300 or within the workpiece 300.

Unlike the transfer blade 100, the cross-shape transfer blade 200 has more points of support and contact with the backside of the workpiece 300. Unlike the transfer blade 100, the points of contact at the third and fourth raised regions 226*c*, 226*d* are spaced further outward from the central-line axis 218 of the cross-shape transfer blade 200 and the fifth raised region 226*e* is larger than the third and fourth raised regions 104*c*, 104*d* of the transfer blade 100. The third and fourth raised regions 104*c*, 104*d* provide greater support to the workpiece 300 such that downward forces across the workpiece 300 due to gravity are more evenly distributed across the plurality of raised regions 226*a*-226*e* of the cross-shape transfer blade 200 relative to the plurality of raised regions 104*a*-104*d* of the transfer blade 100. The fifth raised region 226*e* of the cross-shape transfer blade 200 being larger than the third and fourth raised regions 104*c*, 104*d* of the transfer blade 100 provides greater support to the workpiece such that downward forces across the workpiece 300 due to gravity are more evenly distributed across the plurality of raised regions 226*a*-226*e* of the transfer blade relative to the plurality of raised regions 104*a*-104*d* of the transfer blade 100. As the cross-shape transfer blade 200 more evenly distributes the downward forces of gravity experiences by the workpiece 300 than the transfer blade 100, warpage, bending, deformation, defects, or damage along respective surfaces of the workpiece 300 or within the workpiece 300 is more readily prevented or further reduced in the amount or the likelihood when utilizing the cross-shape transfer blade 200 instead of the transfer blade 100. For example, when the workpiece 300 is instead a thin workpiece with a thickness within a range of 0.1-millimeter (mm) to 0.5-millimeter (mm) or equal to the upper and lower ends of this range, the thin workpiece would warp, bend, and deform by a greater amount when on the transfer blade 100 is utilized to support the thin workpiece due to the downward forces of gravity as compared to when the cross-shape transfer blade 200 is instead utilized to support the thin workpiece. In other words, the increased contact area between the backside of the workpiece or thin workpiece and the cross-shape transfer blade 200 as compared to the transfer blade 100 further prevents or reduces the amount or the likelihood of warpage, bending, deformation, defects or damage along respective surfaces of the workpiece 300 or within the workpiece 300. To summarize, the cross-shape transfer blade 200 further prevents or reduces the amount or likelihood of respective workpieces being damaged during transport as compared to when the transfer blade 100 is utilized to transport the respective workpieces.

FIG. 4 is a zoomed in, enhanced view of section 4-4 as shown in FIG. 3 of the robot or transfer blade as shown in FIGS. 1A-1C overlapped with the robot or transfer blade as shown in FIGS. 2A-2D, in accordance with some embodiments, for comparison purposes. As shown in FIG. 4, a respective area of the second raised region 104*b* of the transfer blade 100 that would contact a backside of a respective workpiece is smaller than a respective area of the second raised region 226*b* of the cross-shape transfer blade 200. As discussed above, the respective area of the second raised region 226*b* of the cross-shape transfer blade 200 being larger than the respective area of the second raised region 104*b* of the transfer blade 100 further prevents or reduces the amount or likelihood of warpage, bending, deformation, damage or defects propagating along respective surfaces of a respective workpiece or within the respective workpiece being transported by the cross-shape transfer blade 200 as compared to when the transfer blade 100 is instead utilized to transport the respective workpiece.

Figure 5A:
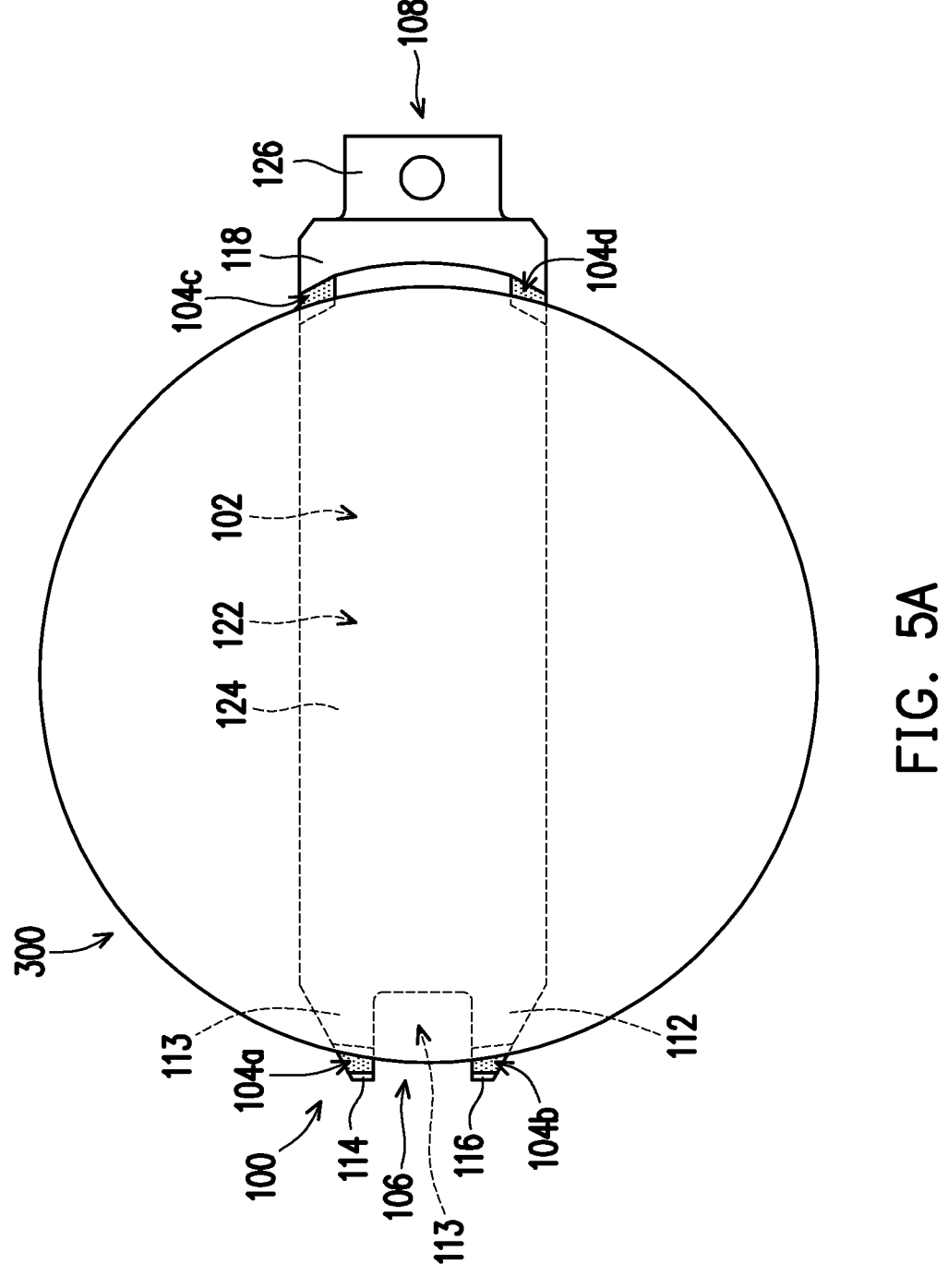
FIG. 5A is a top plan view of a workpiece present on the robot or transfer blade as shown in FIGS. 1A-1C.
Figure 5B:
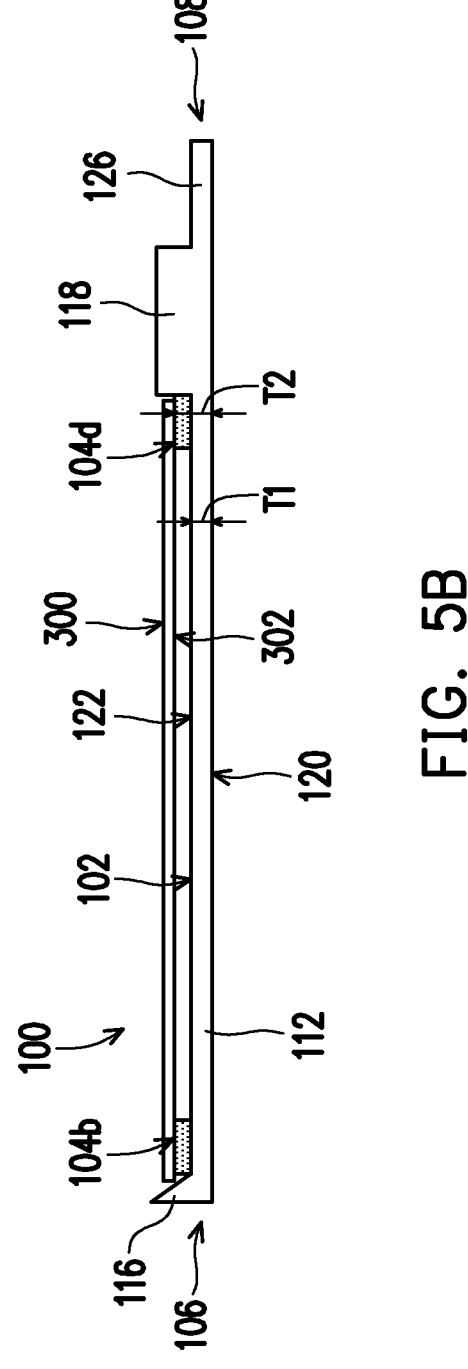
FIG. 5B is a side view of the workpiece present on the robot or transfer blade as shown in FIGS. 1A-1C.

FIG. 5A is a top plan view of the workpiece 300 present on the transfer blade 100 as shown in FIGS. 1A-1C. FIG. 5B is a side view of the workpiece 300 present on the transfer blade 100 as shown in FIGS. 1A-1C. A backside 302 of the workpiece 300 contacts the plurality of raised regions 104*a*-104*d* and does not contact the lower region 122 of the transfer blade 100. As shown in FIG. 5B, the backside of the workpiece 300 contacts the plurality of raised regions 104*a*-104*d* and is suspended over the lower region 122 such that the backside 302 of the workpiece does not contact the lower region 122 of the transfer blade 100.

Figure 6A:
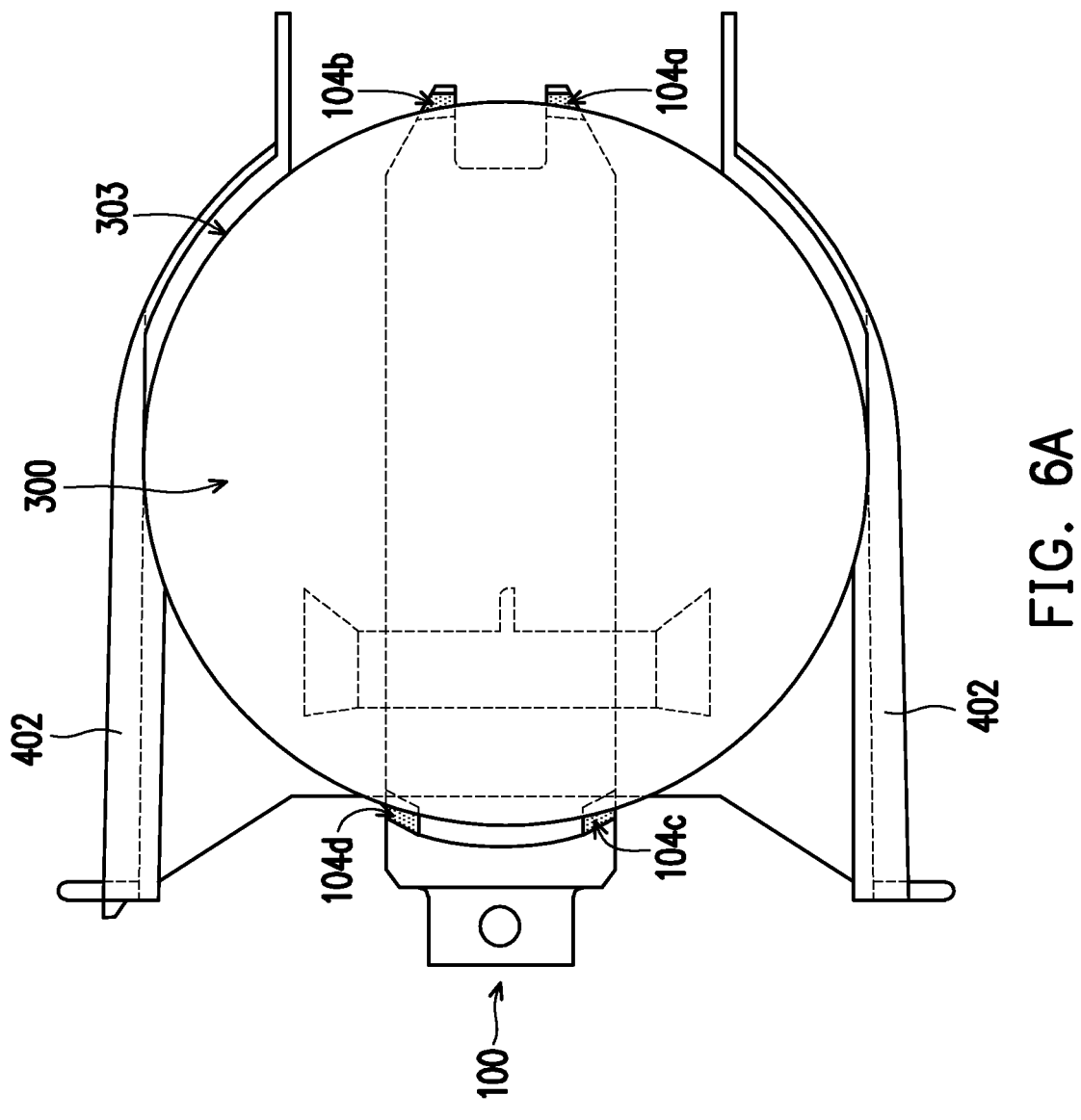
FIG. 6A is a top plan view of the workpiece and the robot or transfer blade as shown in FIGS. 1A-1C within a cassette.

FIG. 6A is a top plan view of the workpiece 300 that is on a support structure 402 of a workpiece cassette 400 and a transfer blade 100 being aligned with and underneath the workpiece 300. An edge 303 of the workpiece 300 overlaps and contacts the support structure 402 of the workpiece cassette 400. In other words, the workpiece 300 rests on the support structure 402 before being removed from the support structure by the transfer blade 100. The support structure 402 of the workpiece cassette 400 may be a shelf within the workpiece cassette 400.

Figures 6B, 6C:
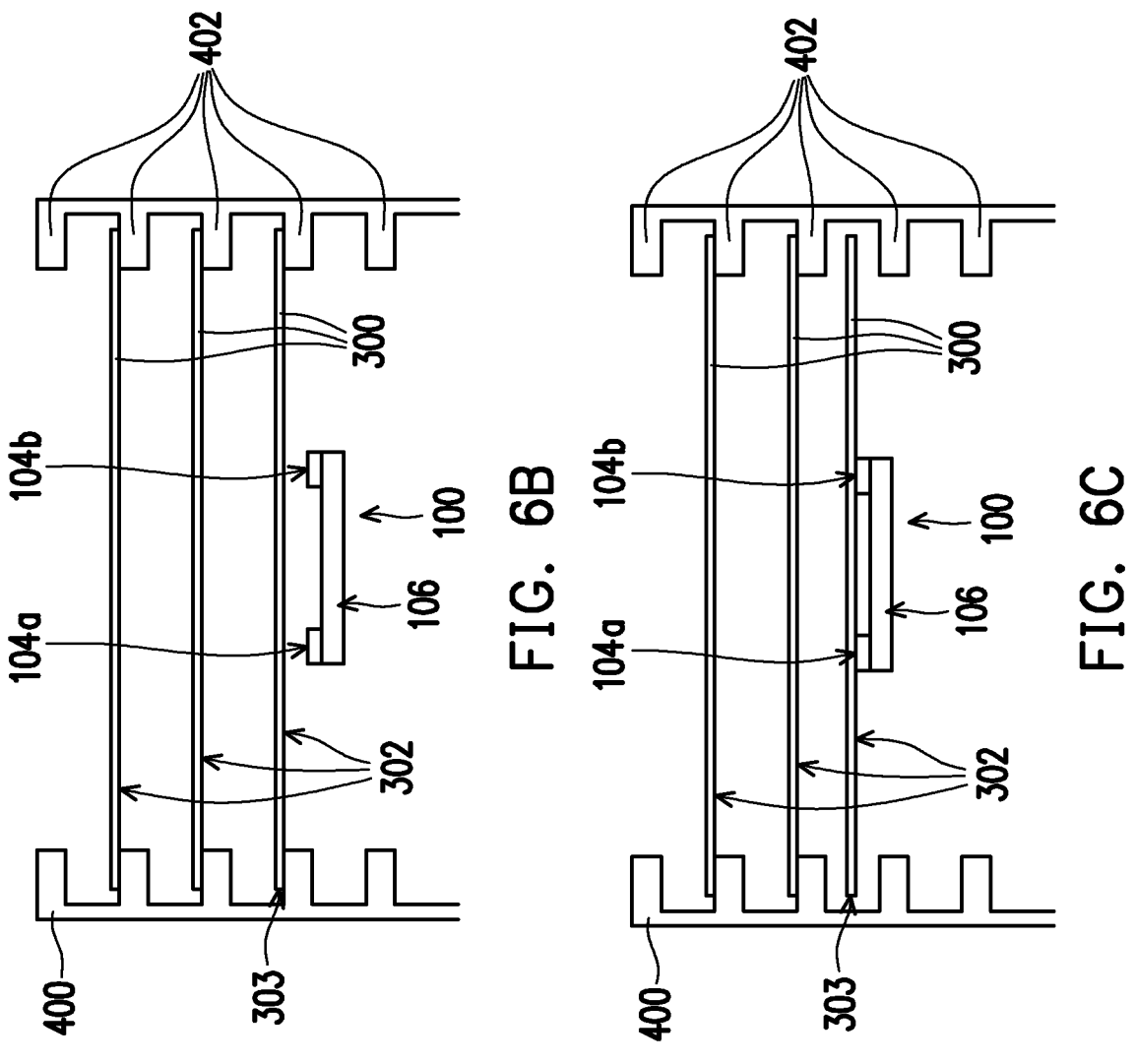
FIG. 6B is a front side view of the workpiece and the robot or transfer blade as shown in FIGS. 1A-1C within the cassette as shown in FIG. 6A.
FIG. 6C is a front side view of the workpiece and the robot or transfer blade as shown in FIGS. 1A-1C within the cassette and the robot or transfer blade as shown in FIGS. 1A-1C coming into contact with a backside of the workpiece.

FIG. 6B is a front side view of the workpiece 300, the transfer blade 100, and the cassette 400. FIG. 6C is a front side view of the workpiece 300, the transfer blade 100, and the cassette 400 in which the transfer blade 100 has removed the workpiece 300 from the support structure 402 on which the workpiece 300 previously rested. When removing the workpiece 300 from the support structure 402 of the cassette 400, the transfer blade 100 is positioned underneath the workpiece 300 and is raised upward until the plurality of raised regions 104*a*-104*d* contact the backside 302 of the workpiece 300, which can readily be seen in FIG. 6C. The lifting of the transfer blade 100 is continued upwards such that the backside 302 of the workpiece 300 is removed from the support structure 402 of the cassette 400. The workpiece 300 is a wafer with a relatively normal thickness. For example, this normal thickness of the wafer ranges from 0.5-millimeters (mm) to 1-millimeter (mm), or is equal to the upper and lower ends of this range. In some situations, the normal thickness of the workpiece 300 may be equal to 0.74-millimeters (mm) or may be greater than 1-millimeter (mm). As can be readily seen in FIG. 6C, once the transfer blade 100 is lifted up enough the backside 302 and the edge 303 of the workpiece 300 are no longer in contact with the support structure 402 of the cassette 400 such that there is enough clearance for the workpiece 300 and the transfer blade 100 to be removed from the cassette 400 to transport the workpiece 300 to another location.

For simplicity and brevity of the present disclosure, while not shown, the reverse of the process as discussed above with respect to the transfer blade 100 is performed to insert the workpiece 300 into the cassette 400 such that the workpiece 300 rests on the support structure 402.

Figures 7A, 7B:
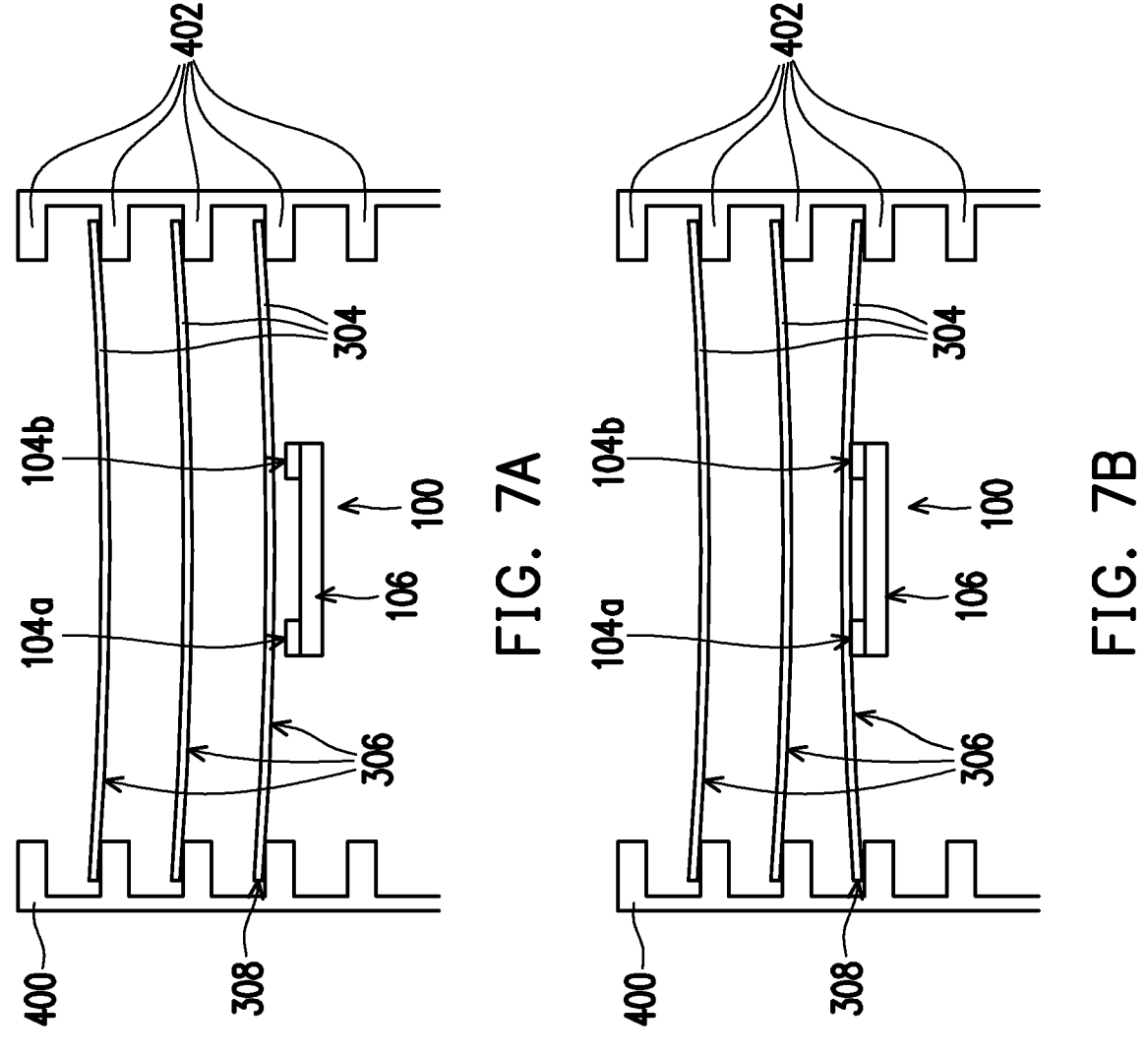
FIG. 7A is a front side view of a thin workpiece and the robot or transfer blade as shown in FIGS. 1A-1D within a cassette.
FIG. 7B is a front side view of the thin workpiece and the robot or transfer blade as shown in FIGS. 1A-1C within the cassette and the robot or transfer blade coming into contact with a backside of the thin workpiece.

FIG. 7A is a front side view of a thin workpiece 304, the transfer blade 100, and the cassette 400. FIG. 7B is a front side view of the thin workpiece 304, the transfer blade 100, and the cassette 400 in which the transfer blade 100 has contacted a backside surface 306 of the thin workpiece 304 to remove the thin workpiece 304 from the support structure 402 of the cassette 400. As shown in FIG. 7A, the thin workpiece 304 is slightly bent downward due to the thin workpiece 304 being relatively thin. For example, this thin thickness of the thin workpiece 304, which may be a thin wafer, ranges from 0.1-millimeter (mm) to 0.5-millimeter (mm) or is equal to the upper and lower ends of this range. In some situations, the thin thickness of thin workpiece 304 may be equal to 0.3-millimeters (mm) or may be less than 0.1-millimeter (mm). When removing the thin workpiece 304 from the support structure 402 of the cassette 400, the transfer blade 100 is positioned underneath the thin work-piece 304 and is raised upward until the plurality of raised regions 104a-104d contact the backside 306 of the thin workpiece 304, which can readily be seen in FIG. 6C. The lifting of the transfer blade 100 is continued upwards in an attempt to remove the backside 306 of the thin workpiece 304 from the support structure 402. However, as shown in FIG. 7B, as the transfer blade 100 is continually moved upward after coming into contact with the backside 306 of the thin workpiece 304, the thin workpiece 304 bends upward such that an edge 308 or a peripheral region of the backside 306 in close proximity to the edge 308 of the thin workpiece 304 remains in contact with the support structure 402. As the edge 308 of the thin workpiece 304 has not cleared the support structure 402 of the cassette 400, as the transfer blade 100 is moved outward in an attempt to remove the thin workpiece 304 from the support structure 402 of the cassette 400, the edge 308 and the peripheral region of the backside 306 of the thin workpiece 304 is damaged as they slide across the support structure 402 when the transfer blade 100 moves away from the cassette 400. For example, this damage may include cracking, scratching, or other similar or like types of damage or defects that will occur at the edge 308 of the thin workpiece 304 due to the edge 308 sliding along the corresponding support structure 402. As will become readily apparent in view of the discussion herein with respect to FIGS. 12A and 12B, utilizing the cross-shape transfer blade 200 instead of the transfer blade 100 prevents the damage that occurs due to the edge 308 of the thin workpiece 304 not fully clearing the support struc-ture 402 before the transfer blade 100 attempts to remove the thin workpiece 304 from the cassette 400.

Figures 7C, 7D:
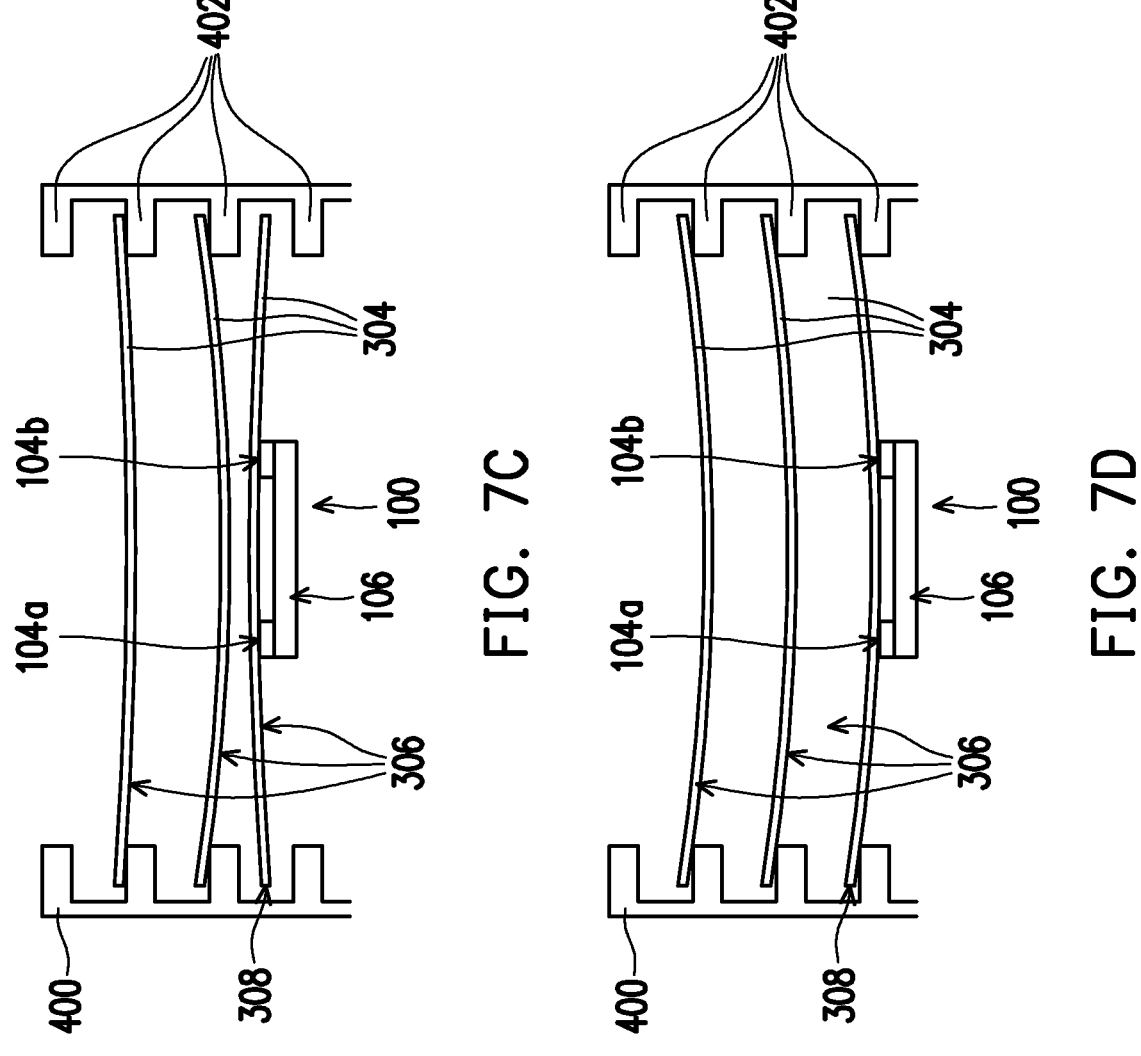
FIG. 7C is a front side view of the thin workpiece and the robot or transfer blade as shown in FIGS. 1A-1C within the cassette and the robot or transfer blade placing the thin workpiece within the cassette.
FIG. 7D is a front side view of the thin workpiece and the robot or transfer blade as shown in FIGS. 1A-1C within the cassette and the robot or transfer blade placing the thin workpiece within the cassette and the robot or transfer blade attempting to come out of contact with the backside of the thin workpiece.

FIG. 7C is a front side view of the thin workpiece 304, the transfer blade 100, and the cassette 400 in which the transfer blade 100 is placing the thin workpiece 304 onto the support structure 402 and into the cassette 400. To place the thin workpiece 304 onto the support structure 402 of the cassette 400, the thin workpiece 304, which is currently on the plurality of raised regions 104a-104d, and the transfer blade 100 are inserted into the cassette 400 such that the edge 308 of the thin workpiece 304 is aligned with and overlapping the corresponding support structure 402 of the cassette 400. The transfer blade 100 is then lowered such that the backside 306 of the thin workpiece 304 in close proximity to the edge 308 of the thin workpiece 304 comes into contact with the corresponding support structure 402 of the cassette 400. However, once the backside in close proximity to the edge 308 of the thin workpiece 304 is in contact with the support structure 402 of the cassette 400, the plurality of raised regions 104a-104d of the transfer blade 100 have not come fully out of contact with a central region of the backside 306 of the thin workpiece 304 (see FIG. 7D). As the plurality of raised regions 104a-104d have not come fully out of contact with the central region of the backside 306 of the thin workpiece 304 as shown in FIG. 7D, as the transfer blade 100 is removed from the cassette 400, the plurality of raised regions 104a-104d slide along the central region of the backside 306 causing damage to the backside 306 of the thin workpiece 304. For example, this damage may include cracking, scratching, or other similar or like types of damage or defects that will occur at and along the backside 306 of the thin workpiece 304 due to the plurality of raised regions 104a-104d sliding along the backside 306 of the thin work-piece 304. As will become readily apparent in view of the discussion herein with respect to FIGS. 12A and 12B, utilizing the cross-shape transfer blade 200 instead of the transfer blade 100 prevents the damage that occurs due to the plurality of raised regions 104a-104d of the transfer blade 100 not fully coming out of contact with the backside 306 of the thin workpiece 304 after the thin workpiece 304 has been placed on the corresponding support structure 402 of the cassette and removing the transfer blade 100 from the cassette 400 even though the plurality of raised regions 104a-104d are still in contact with the backside 306 of the thin workpiece 304.

Figure 8A:
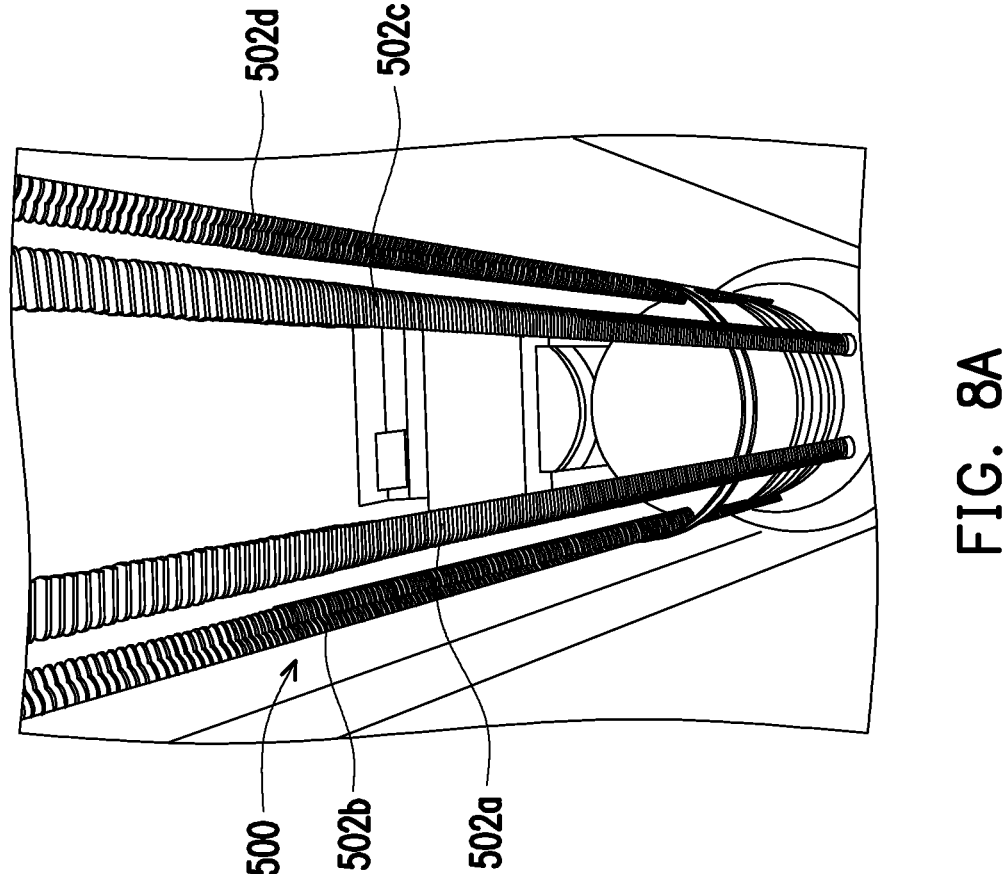
FIG. 8A is a perspective view of side rod supports of a processing tool, in accordance with some embodiments.

FIG. 8A is a perspective view of a plurality of side rod supports 502a-502d that are present within a processing tool 502. The plurality of side rod supports 502a-502d includes a first side rod support 502a, a second side rod support 502b, a third side rod support 502c, and a fourth side rod support 502d. Each one of the plurality of side rod supports 502a-502d includes a plurality of slots in which respective work-pieces (e.g., the workpieces 300 or the thin workpieces 304) are inserted to be stored within the processing tool 502 for processing and refinement of the respective workpieces (e.g., the workpieces 300 or the thin workpieces 304). The same issues as discussed above with respect to the thin workpieces 304 being removed and inserted out of and into the cassette 400 when utilizing the transfer blade 100 exist when removing or inserting the thin workpieces 304 out of or into the slots of the plurality of side rod supports 502a-502d utilizing the transfer blade 100. As the issues are essentially the same, the discussion of these issues is not reproduced herein for simplicity and brevity of the present disclosure.

Figure 8B:
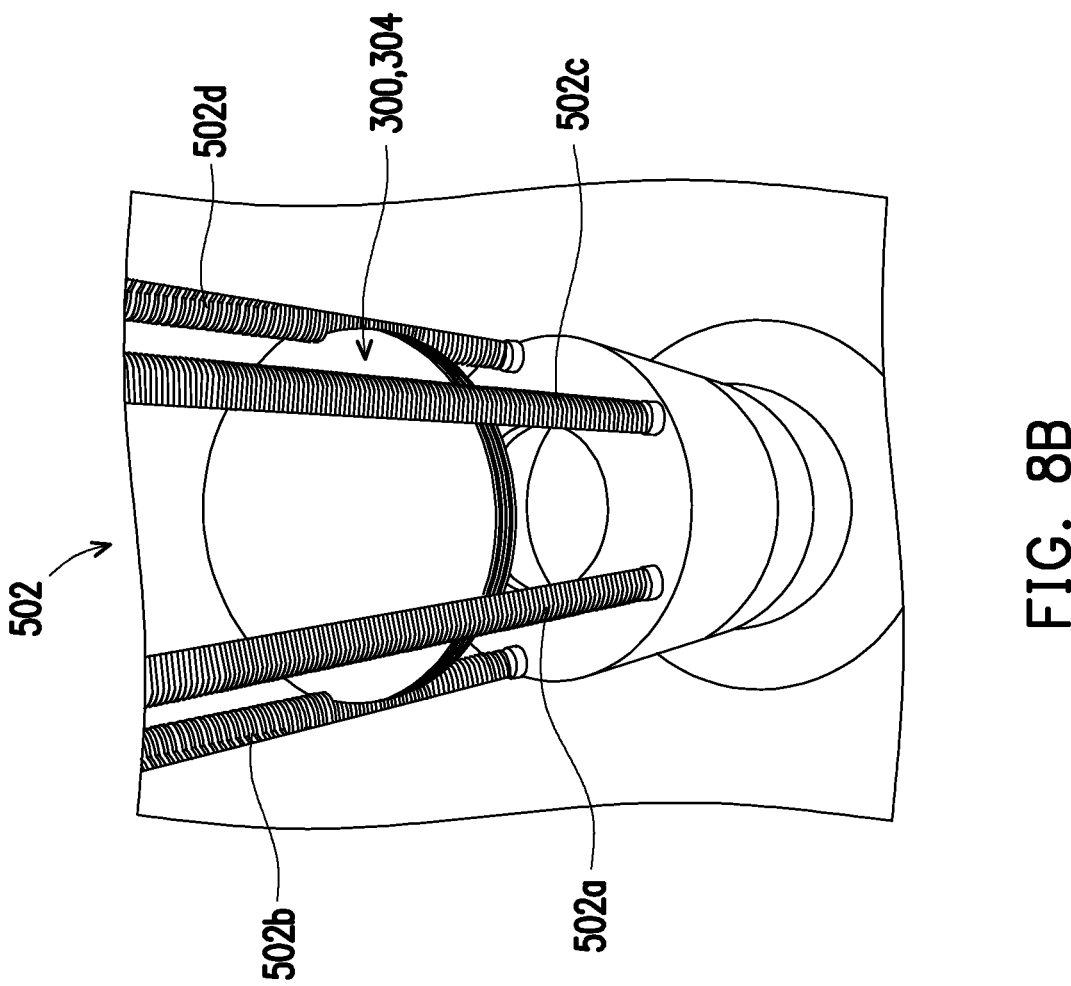
FIG. 8B is a perspective view of the side rod supports of the processing tool as shown in FIG. 8A with one or more workpieces present on and in the side rod supports of the processing tool as shown in FIG. 8A, in accordance with some embodiments.

FIG. 8B is a perspective view of the plurality of side rod supports 502a-502d that are present within the processing tool 502 when multiple ones of the respective workpieces (e.g., the workpieces 300 or the thin workpieces 304) are present within respective slots of the plurality of side rod portions 502a-502d.

Figure 8C:
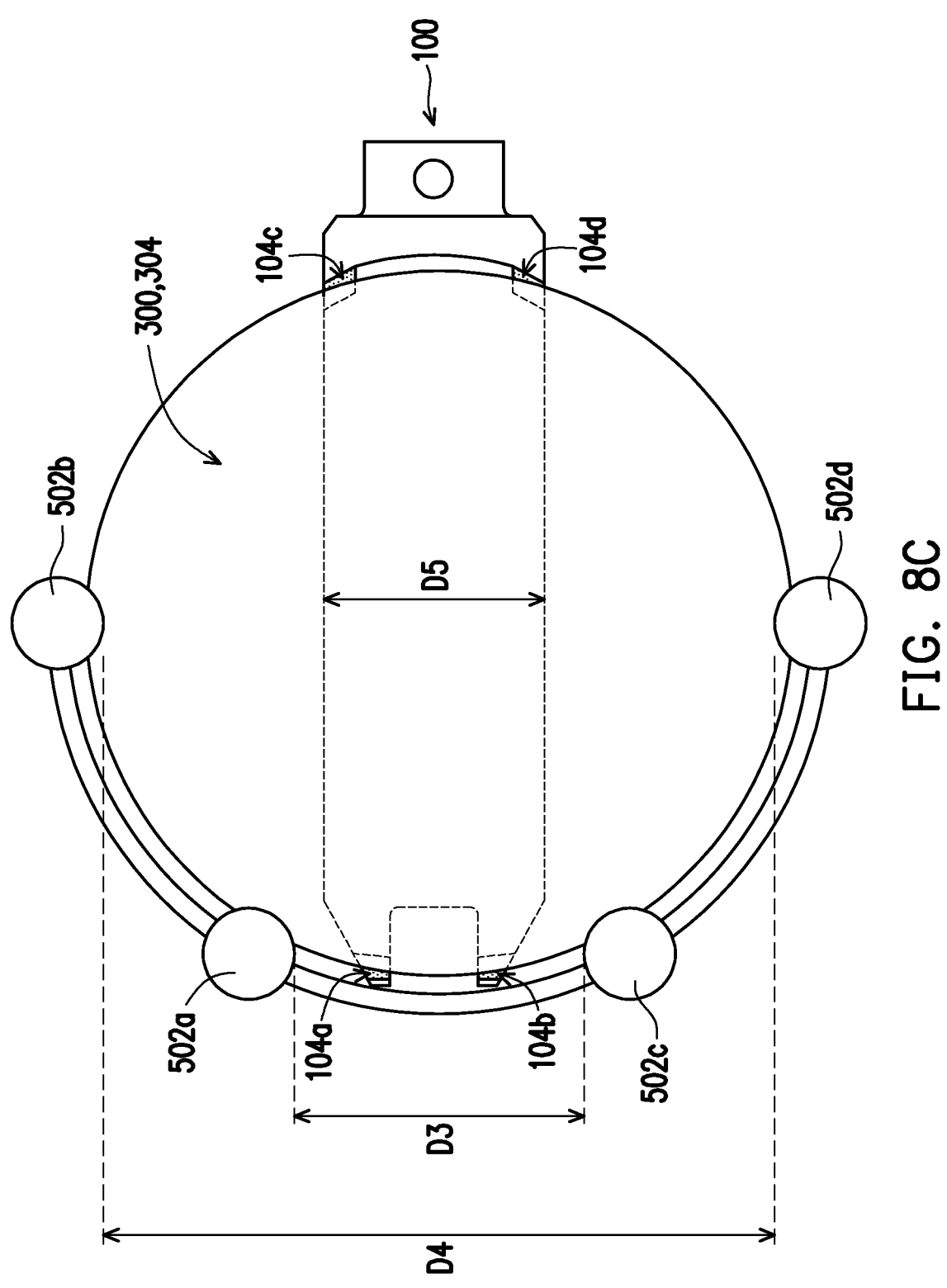
FIG. 8C is a top plan view of the side rod supports of the processing tool as shown in FIG. 8B with the one or more workpieces present on and in the side rod supports of the processing tool as shown in FIG. 8A and the robot or transfer blade as shown in FIGS. 1A-1C between the side rod supports of the processing tool as shown in FIG. 8A, in accordance with some embodiments.

FIG. 8C is a top plan view of at least one respective workpiece (e.g., one of the workpieces 300 or the thin workpieces 304) inserted into respective slots of the plural-ity of side rod supports 502a-502d for storage within the processing tool 502 for processing or refinement of the at least one respective workpiece. The transfer blade 100 is shown in FIG. 8C and is underneath the at least one respective workpiece 300, 304. As shown in FIG. 8C, the first side rod support 502a and the third side rod support 502c are spaced apart from each other by a third dimension D3, and the second side rod support 502b and the fourth side rod support 502d are spaced apart from each other by a fourth dimension D4. The third dimension D3 is less than the fourth dimension D4. The transfer blade 100 includes a fifth dimension D5 that extends between opposite sidewalls of the transfer blade 100. The fifth dimension D5 is less than the third dimension D3 and the fourth dimension D4. The fifth dimension D5 is less than the third dimension D3 such that the transfer blade 100 has a low likelihood of coming into contact with the first and third side rod supports 502a, 502c.

Figure 9A:
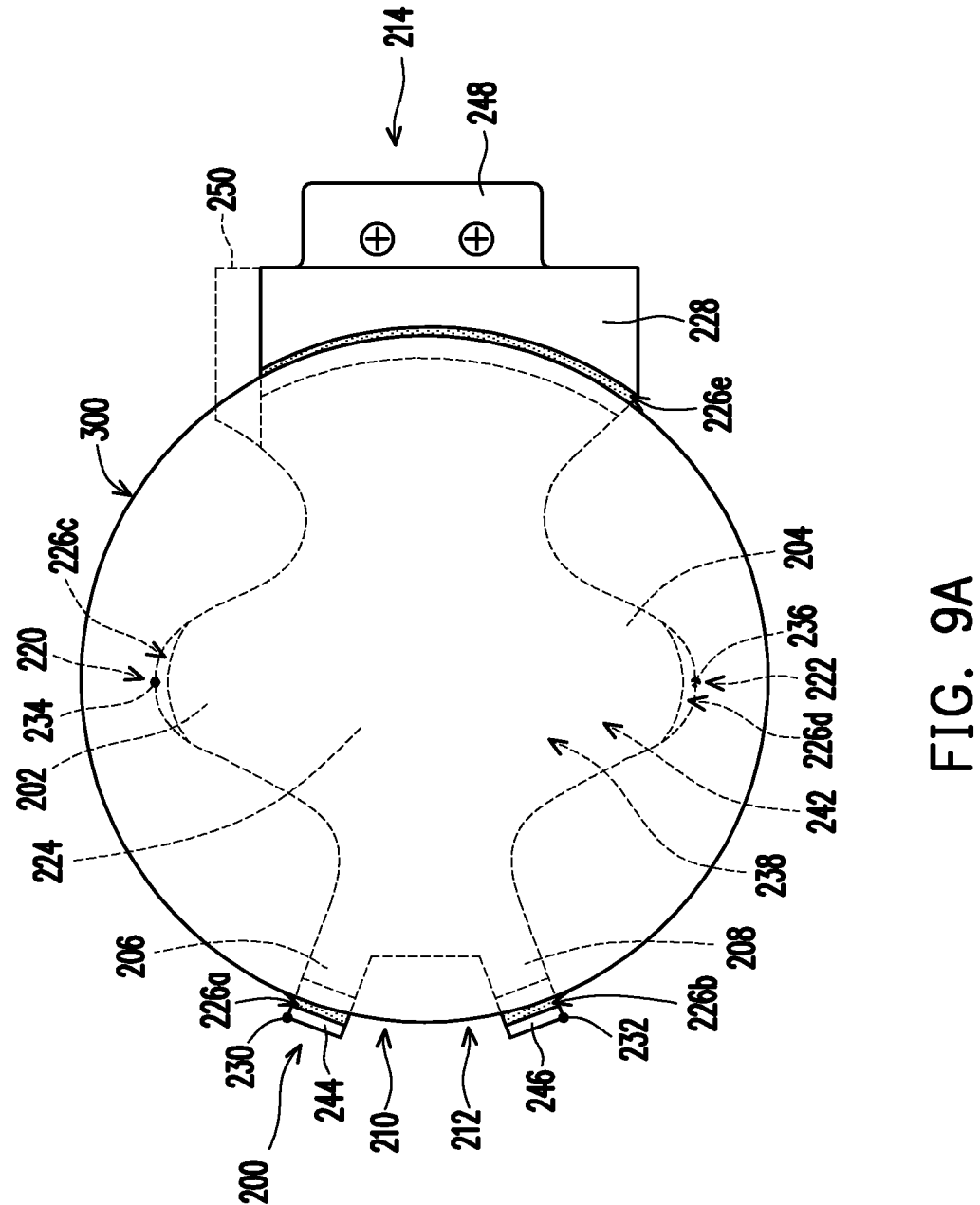
FIG. 9A is a top plan view of a workpiece present on the cross-shape robot or transfer blade as shown in FIGS. 2A-2D, in accordance with some embodiments.
Figure 9B:
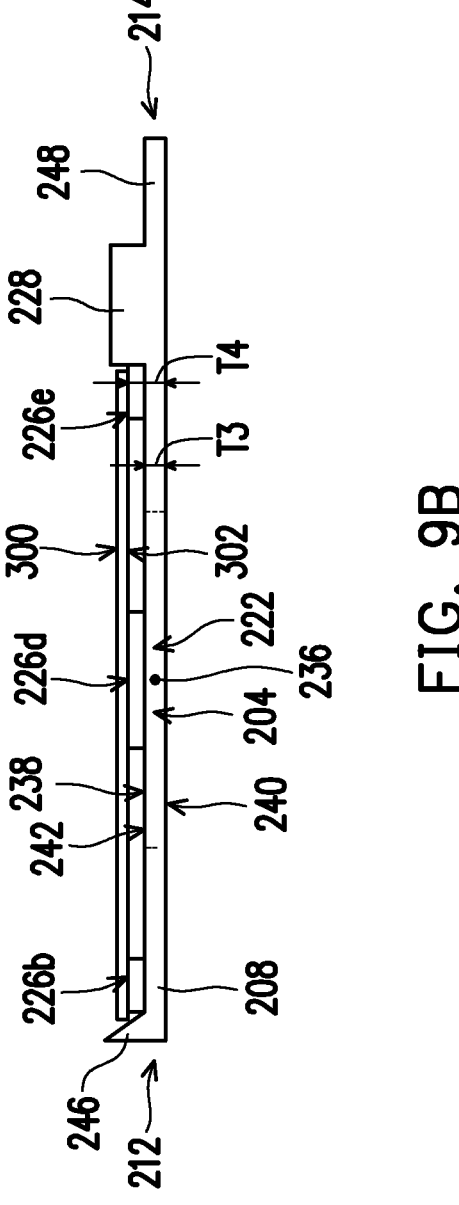
FIG. 9B is a side view of the workpiece present on the cross-shape robot or transfer blade as shown in FIGS. 2A-2D, in accordance with some embodiments.

FIG. 9A is a top plan view of the workpiece 300 present on the cross-shape transfer blade 200 as shown in FIGS. 2A-2D, in accordance with some embodiments. FIG. 9B is a side view of the workpiece 300 present on the cross-shape transfer blade 200 as shown in FIGS. 2A-2D. The backside 302 of the workpiece 300 contacts the plurality of raised regions 226a-226e and does not contact the lower region 242 of the cross-shape transfer blade 200. As shown in FIG. 9B, the backside 302 of the workpiece 300 contacts the plurality of raised regions 226a-226e and is suspended over the lower region 242 such that the backside 302 of the workpiece 300 does not contact the lower region 242 of the cross-shape transfer blade 200.

Figure 10:
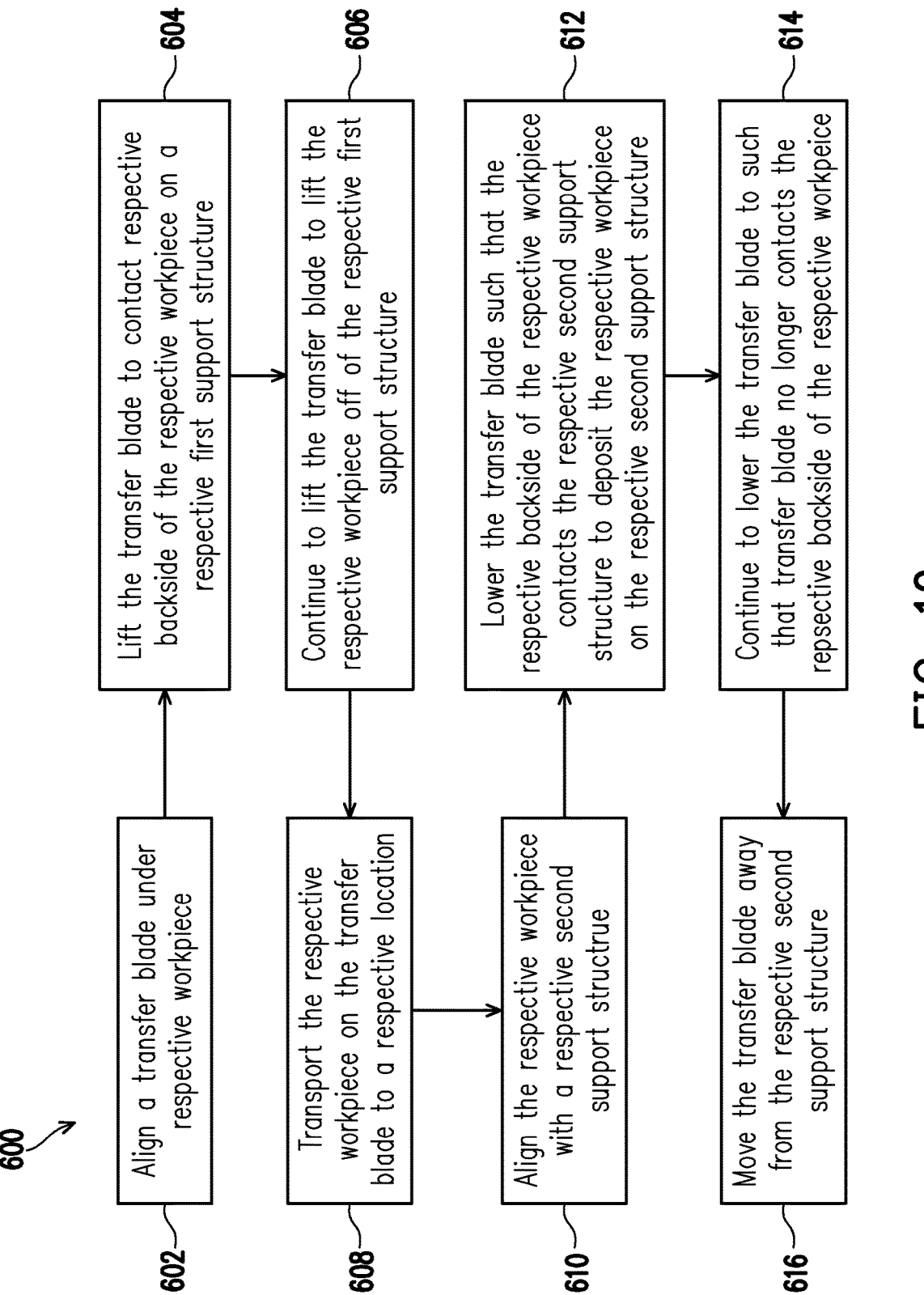
FIG. 10 is a flowchart of a method of utilizing a respective robot or transfer blade to transfer, transport, and support a respective workpiece between various and respective locations, in accordance with some embodiments.

FIG. 10 is a flowchart 600 of a method of transferring, transporting, and supporting a respective workpiece (e.g., the workpiece 300 or the thin workpiece 304) with the cross-shape transfer blade 200, in accordance with some embodiments. The method 600 includes a plurality of steps 602, 604, 606, 608, 610, 612, 614, 616. In other words, the method 600 includes a first, second, third, fourth, fifth, sixth, seventh, and eighth step 602, 604, 606, 608, 610, 612, 614, 616.

Figure 11A:
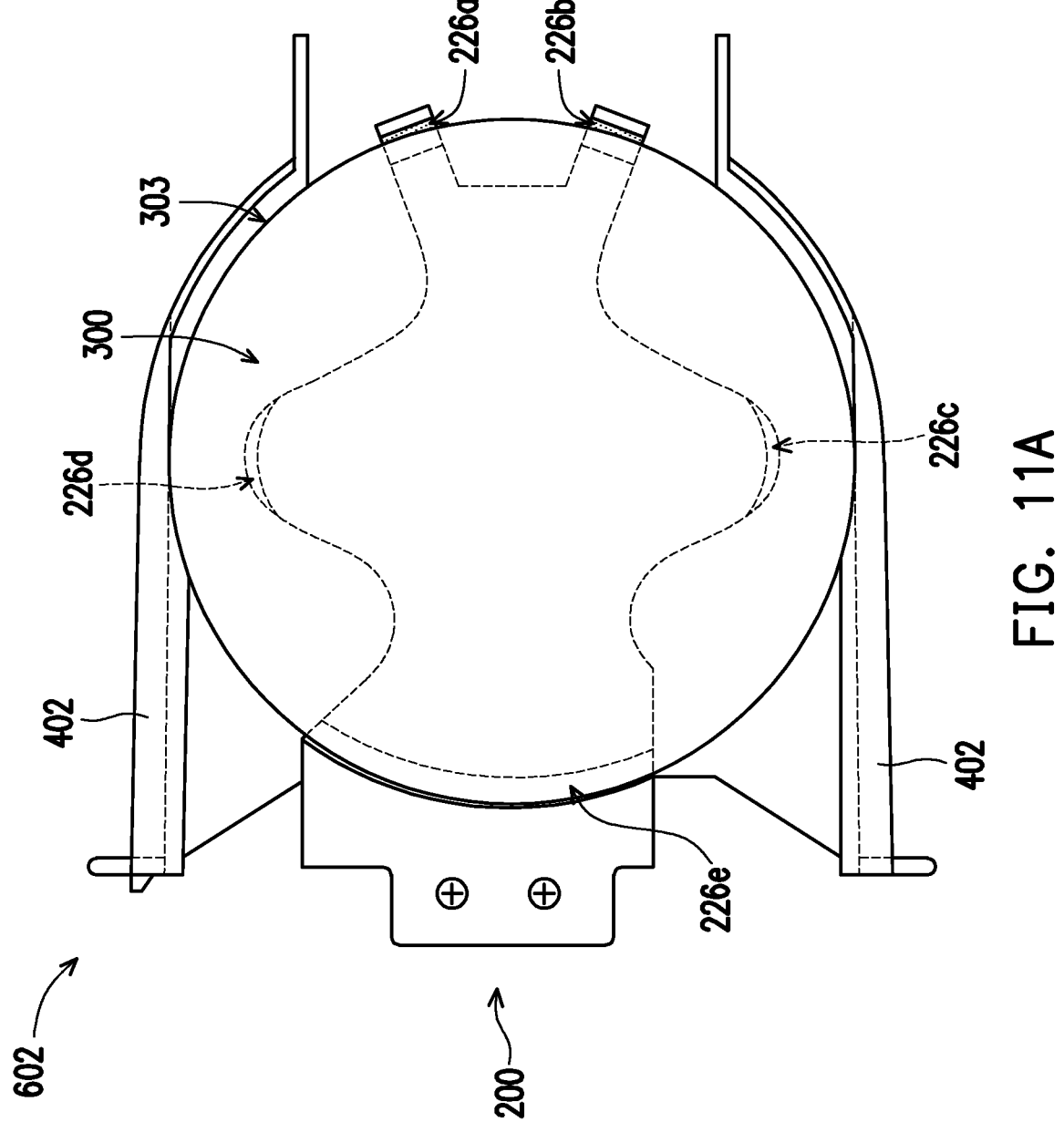
FIG. 11A is a top plan view of the workpiece and the cross-shape robot or transfer blade as shown in FIGS. 2A-2D within a cassette, in accordance with some embodiments.
Figure 11B:
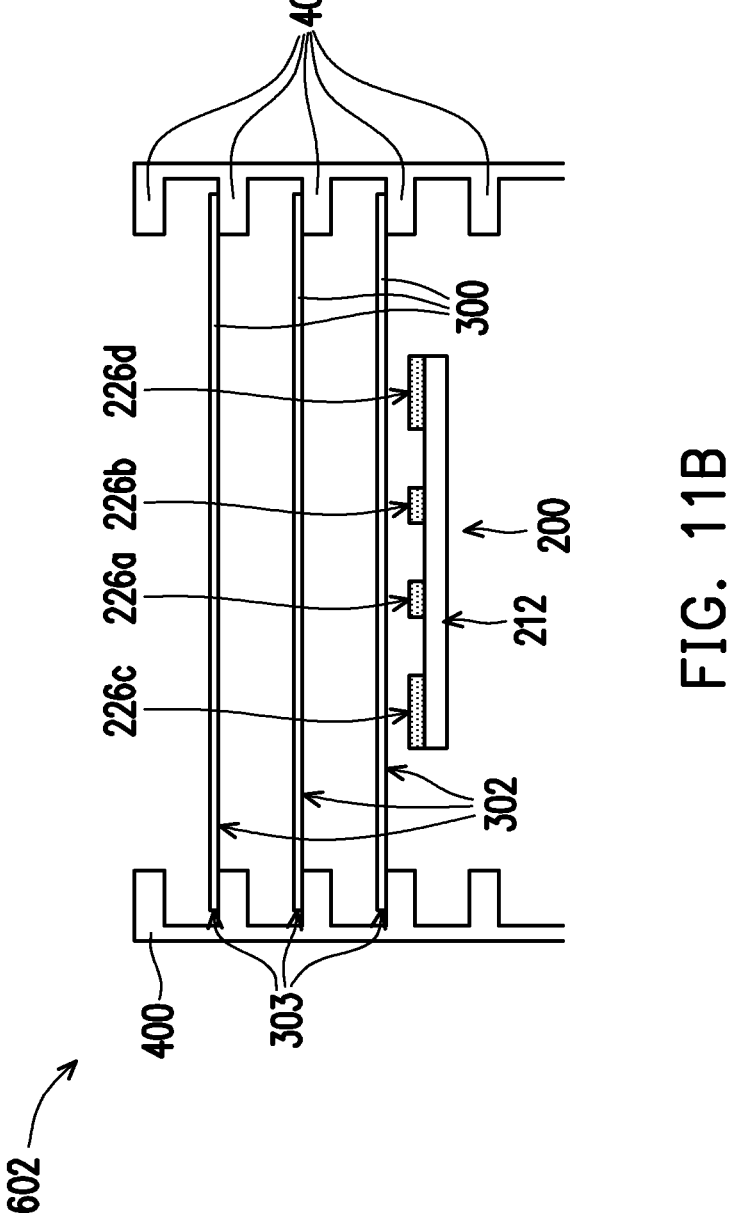
FIG. 11B is a front side view of the workpiece and the cross-shape robot or transfer blade as shown in FIGS. 2A-2D within the cassette as shown in FIG. 10A, in accordance with some embodiments.

In the first step 602, the cross-shape transfer blade 200 is aligned with the workpiece 300 and is underneath the backside 302 of the workpiece 300. For example, as shown in FIG. 11B, the cross-shape transfer blade 200 has been positioned underneath the workpiece 300 such that the plurality of raised regions 226a-226e are underneath the backside 302 of the workpiece 300.

Figure 11C:
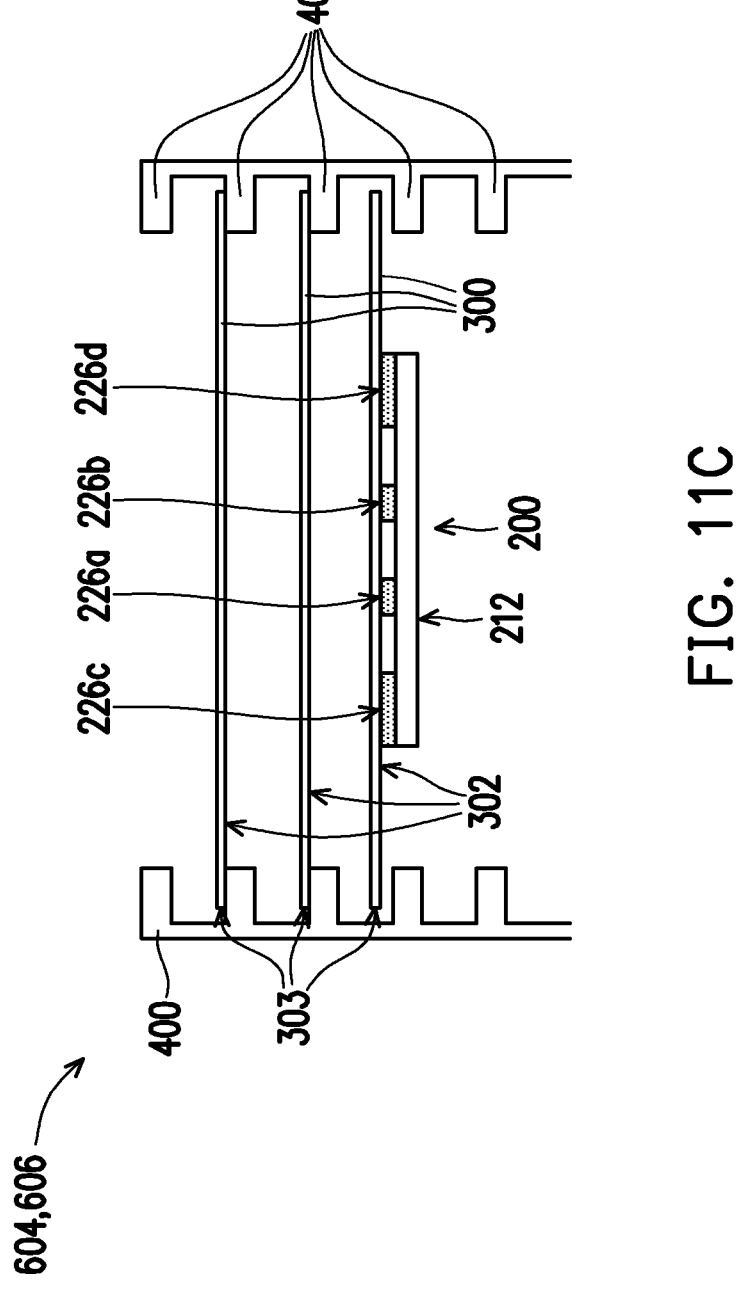
FIG. 11C is a front side view of the workpiece and the cross-shape robot or transfer blade as shown in FIGS. 2A-2D within the cassette and the robot or transfer blade as shown in FIGS. 2A-2D coming into contact with a backside of the workpiece, in accordance with some embodiments.

After the first step 602, in a second step 604 the cross-shape transfer blade 200 is raised and moved upwards towards the backside 302 of the workpiece 300 until the plurality of raised regions 226a-226e come into contact with the backside 302 of the workpiece 300. After the second step 604, in a third step 606 the cross-shape transfer blade 200 is continually moved or raised upwards such that the workpiece 300 is removed from the support structures 402 of the cassette 400. The results of the second and third steps 604, 606 may be readily seen in FIG. 11C. For example, after the cross-shape transfer blade 200 has lifted up the workpiece 300 as shown in FIG. 11C, the backside 302 of the workpiece 300 and the edge 303 of the workpiece 300 are no longer in contact with the support structure 402 of the cassette 400

After the second and third steps 604, 606, in a fourth step 608 the workpiece 300 is carried by the cross-shape transfer blade 200 and is transferred, transported, and supported by the cross-shape transfer blade 200 to the processing tool 502.

After the fourth step 608, in a fifth step 610 the cross-shape transfer blade 200 is moved such that the cross-shape transfer blade 200 and the workpiece 300 are inserted between the plurality of side rod supports 502a-502d. The edge 303 of the workpiece 300 is inserted into respective slots 504 (see, for example, FIGS. 12C and 12D of the present disclosure) of each one of the plurality of side rod supports 502a-502d.

After the fifth step 610, in a sixth step 612 the cross-shape transfer blade 200 is lowered such that the backside 302 of the workpiece 300 comes into contact with one or more protrusions 506 that delimit the slots 504.

After the sixth step 612, in a seventh step 614 the cross-shape transfer blade 200 is continually moved downward and away from the backside 302 of the workpiece 300 until the plurality of raised regions 226a-226e are no longer in contact with the backside 302 of the workpiece 300.

After the seventh step 614, in an eighth step 616 the cross-shape transfer blade 200 is removed from between the plurality of side rod supports 502a-502d such that the workpiece 300 is now stored within the plurality of side rod supports 502a-502d. The workpiece 300 stored within the plurality of side rod supports 502a-502d may then be processed by the processing tool 502.

While the discussion of the method 600 is directed to moving at least one respective workpiece (e.g., the workpiece 300 or the thin workpiece 304) from the cassette 400 to the plurality of side rod supports 502a-502d, it will be readily appreciated that the method 600 may also be reversed in order to move the at least one respective workpiece (e.g., the workpiece 300 or the thin workpiece 304) from the plurality of side rod supports 502a-502d to the cassette 400.

Figure 12A:
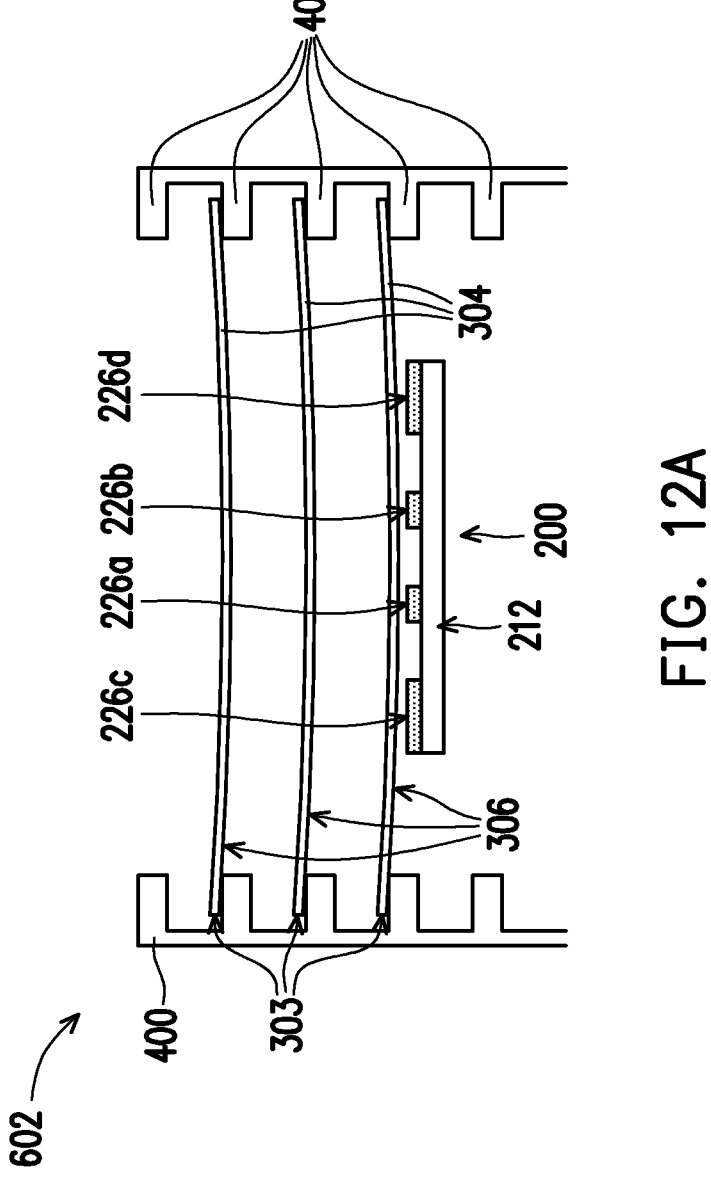
FIG. 12A is a front side view of a thin workpiece and the cross-shape robot or transfer blade as shown in FIGS. 2A-2D within a cassette, in accordance with some embodiments.

FIG. 12A is a front side view of the thin workpiece 304 and the cross-shape transfer blade 200 as shown in FIGS. 2A-2D within the cassette 400. As shown in FIG. 12A, the first step 602 has been carried out in which the cross-shape transfer blade 200 has been inserted into the cassette underneath the backside 306 of the thin workpiece 304.

Figure 12B:
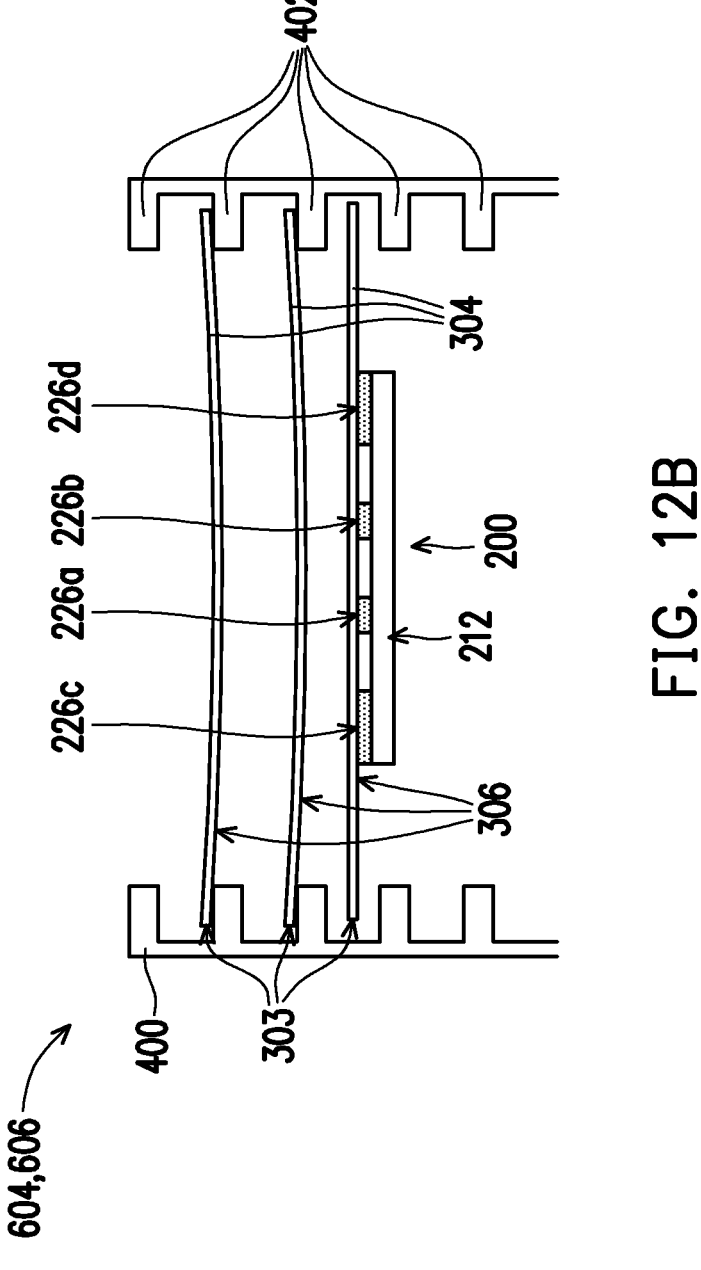
FIG. 12B is a front side view of the thin workpiece and the cross-shape robot or transfer blade as shown in FIGS. 2A-2D within the cassette, and the cross-shape robot or transfer blade as shown in FIGS. 2A-2D coming into contact with a backside of the thin workpiece, in accordance with some embodiments.

FIG. 12B is a front side view of the thin workpiece 304 and the cross-shape transfer blade 200 as shown in FIGS. 2A-2D after the cross-shape transfer blade 200 has lifted the thin workpiece 304 off the corresponding support structure 402 of the cassette 400. In other words, the results of the second and third steps 604, 606 of lifting the thin workpiece 304 may be readily seen in FIG. 12B. Once the cross-shape transfer blade 200 has lifted the thin workpiece 304, the backside 306 of the thin workpiece 304 and the edge 308 of the thin workpiece 304 are fully removed from and no longer in contact with the corresponding support structure 402 of the cassette 400. In view of the thin workpiece 304 being fully out of contact with the corresponding support structure 402 of the cassette 400, the backside 306 of the thin workpiece 304 is not damaged as compared to when the transfer blade 100 is instead utilized as discussed in detail earlier herein. As shown in FIG. 12B, as the cross-shape transfer blade 200 includes the first and second wing structures 202, 204 that provide additional support to the thin workpiece 304 as compared to the transfer blade 100, the thin workpiece 304 is substantially flat or level when picked up by the cross-shape transfer blade 200. This is unlike when the transfer blade 100 picks up the thin workpiece 304 and the thin workpiece 304 bends and deforms as shown in FIG. 7B and results in the backside 306 of the thin workpiece 304 in close proximity to the edge 303 of the thin workpiece 304 still remaining in contact with the support structure 402 of the cassette 400 when the transfer blade 100 moves away from the support structure 402 of the cassette 400 to remove the thin workpiece 304 from the cassette 400. In view of this discussion, as utilizing the cross-shape transfer blade 200 to remove the thin workpiece 304 from the cassette results in the thin workpiece 304 being substantially flat or level once the cross-shape transfer blade 200 fully lifts the thin workpiece 304 such that the thin workpiece 304 fully clears the support structure 402, any damage is prevented or reduced in likelihood of occurring as compared to when the transfer blade 100 is utilized as there is a high likelihood that the backside 306 of the thin workpiece 304 in close proximity to the edge 308 will remain in contact with the support structure 402 when the transfer blade 100 is then moved away from the support structure 402 to remove the thin workpiece 304 from the cassette 400. Accordingly, utilizing the cross-shape transfer blade 200 over the transfer blade 100 prevents or reduces the likelihood of damaging the thin workpiece 304 when removing the thin workpiece 304 from the cassette 400 or from the slots 504 and the protrusions 506 of the plurality of side rod supports 502a-502d.

After the third step 606, in the fourth step 608 the thin workpiece 304 is transferred, transported, and supported by the cross-shape transfer blade 200 to the plurality of side rod supports 502a-502d.

Figures 12C, 12D:
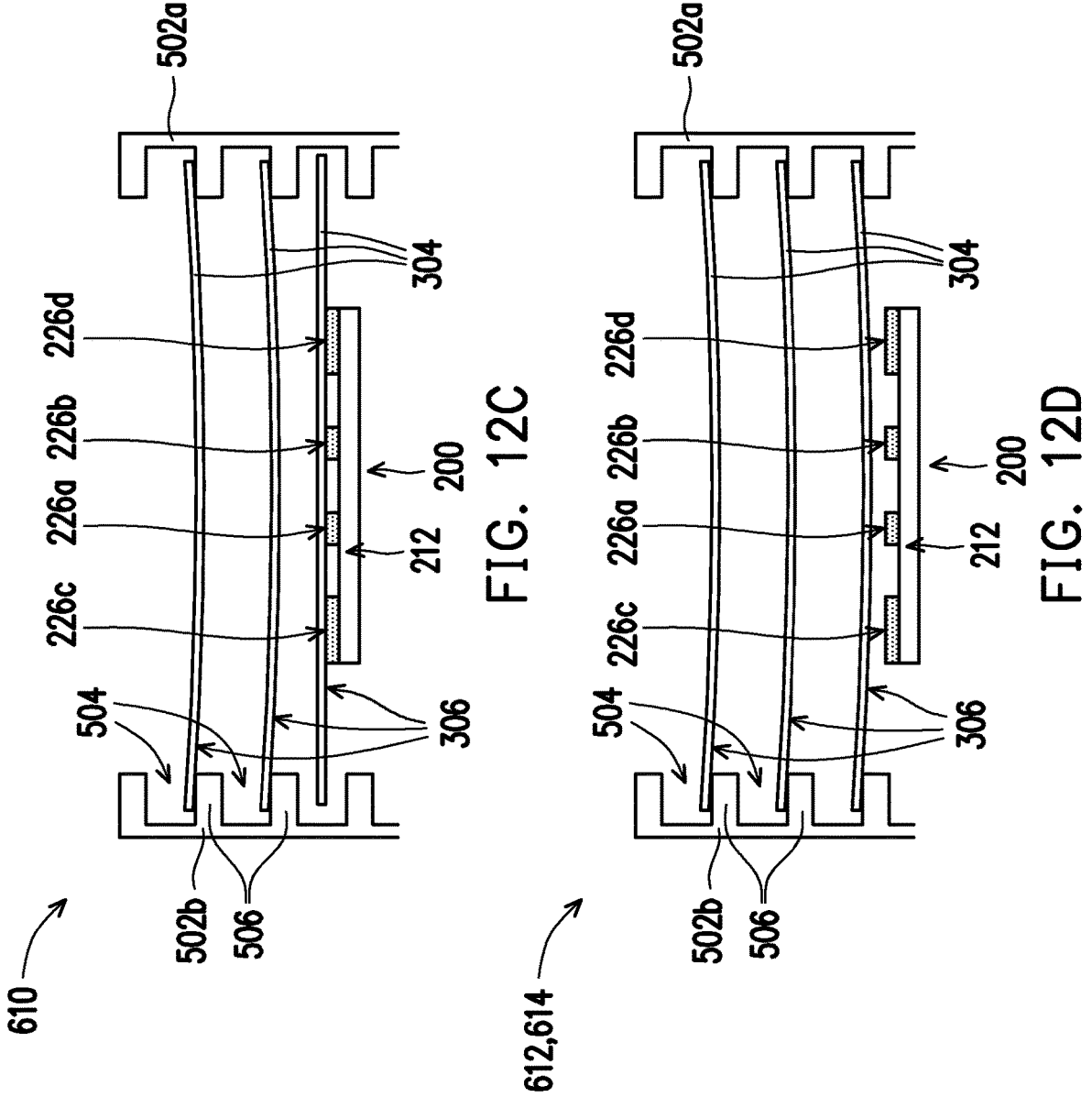
FIG. 12C is a front side view of the thin workpiece and the cross-shape robot or transfer blade as shown in FIGS. 2A-2D within the cassette and the robot or transfer blade placing the thin workpiece within the cassette.
FIG. 12D is a front side view of the thin workpiece and the cross-shape robot or transfer blade as shown in FIGS. 2A-2D within the cassette and the robot or transfer blade placing the thin workpiece within the cassette and the robot or transfer blade coming out of contact with the backside of the thin workpiece, in accordance with some embodiments.

After the fourth step 608, in the fifth step 610 the thin workpiece 304 and the cross-shape transfer blade 200 are inserted between the plurality of side rod supports 502a-502d and the thin workpiece 304 is inserted into corresponding slots 504 of each one the plurality of side rod supports 502a-502d. The results of the fifth step 610 may be readily seen in FIG. 12C of the present disclosure. As shown in FIG. 12C, the thin workpiece 304 remains substantially flat and level when on the cross-shape transfer blade 200.

After the fifth step 610, in the sixth step 612, the cross-shape transfer blade 200 is lowered such that the backside 306 of the thin workpiece 304 in close proximity to the edge 308 of the thin workpiece 304 comes into contact with the protrusions 506 that delimit the corresponding slots 504 of each one of the plurality of side rod supports 502a-502d.

After the sixth step 612, in the seventh step 614 the cross-shape transfer blade 200 continues to be lowered or moved downward such that the plurality of raised regions 226a-226e come fully out of contact with the backside 306 of the thin workpiece 304. The results of the seventh step 614 may readily be seen in FIG. 12D of the present disclosure. As shown in FIG. 12D, the cross-shape transfer blade 200 and the plurality of raised regions 226a-226e come out of contact fully with the backside 306 of the thin workpiece 304 such that there is enough clearance between the backside 306 and the plurality of raised regions 226a-226e that the cross-shape transfer blade 200 may be removed without damaging the backside 306 of the thin workpiece 304. As discussed earlier herein with respect to FIG. 7D, when the transfer blade 100 is utilized, there is a high likelihood of damaging the backside 306 of the thin workpiece 304 as the plurality of raised regions 104a-104d have a high likelihood of not fully coming out of contact with the backside 306 of the thin workpiece 304 when removing the transfer blade 100 from the cassette 400 after the thin workpiece 304 has been placed back onto the support structure 402 of the cassette 400. While the discussion herein is with respect to the cross-shape transfer blade 200 lowering the thin workpiece 304 onto the protrusions 506 and the plurality of raised regions 226a-226e no longer being in contact with the backside 306 before removing the cross-shape transfer blade 200 to prevent or avoid damage to the backside 306 of the thin workpiece 304, this discussion may also readily apply to lowering the thin workpiece 304 onto the support structure 402 of the cassette 400. The plurality of raised regions 226a-226e are fully out of contact with the backside 306 of the thin workpiece 304 once the thin workpiece 304 is on the support structure 402 or the protrusions 506 and the cross-shape transfer blade 200 is lowered unlike the transfer blade 100 because the fourth thickness T4 of the cross-shape transfer blade 200 is less than the second thickness T2 of the transfer blade 100. In view of this discussion, after the seventh step 614, in the eighth step 616 the cross-shape transfer blade 200 is moved away from the plurality of side rod supports 502a-502d. In view of the above discussion, utilizing the cross-shape transfer blade 200 instead of the transfer blade 100 further prevents or reduces the likelihood of damaging the backside 306 of the thin workpiece 304.

Figure 13:
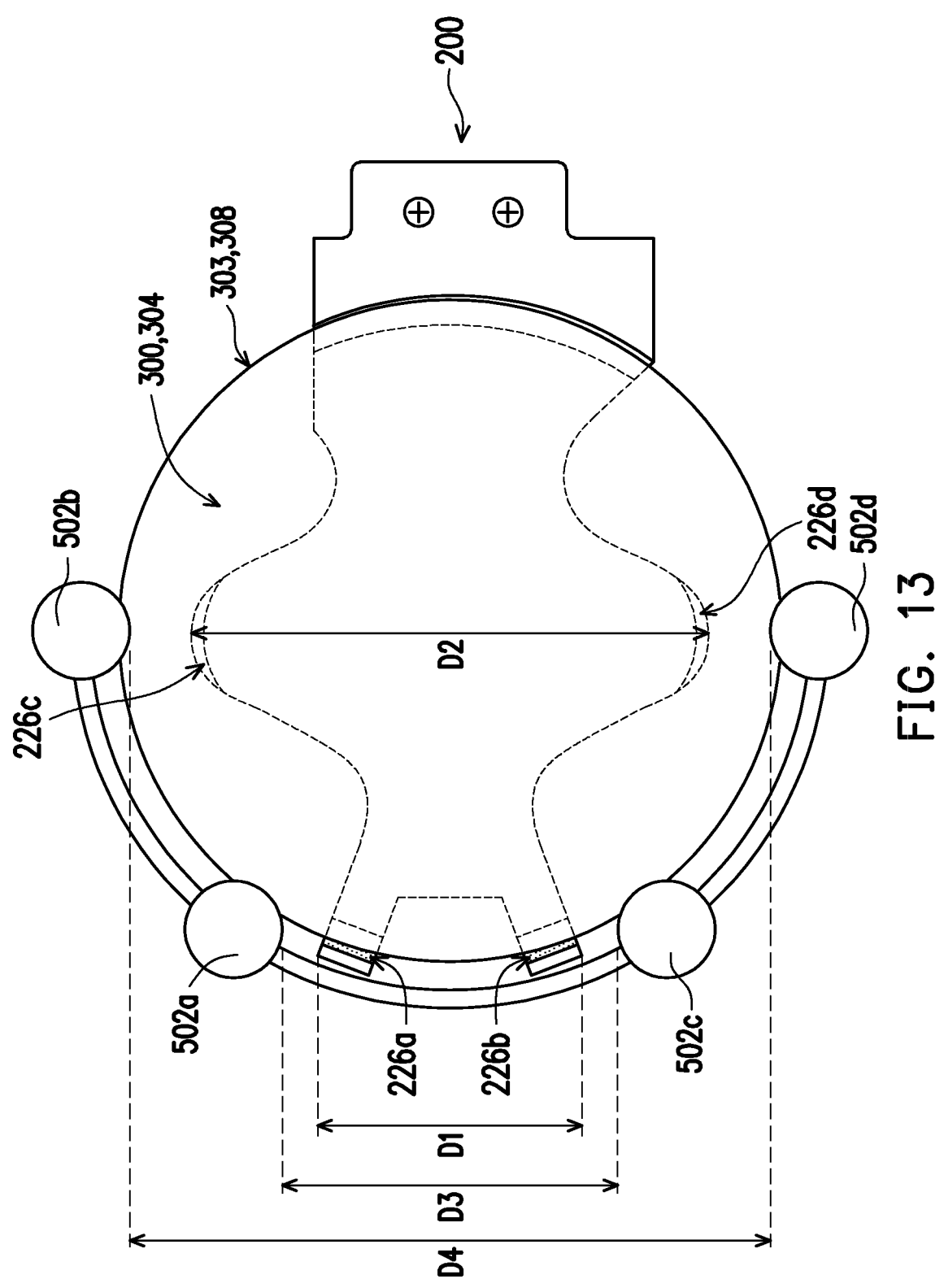
FIG. 13 is a top plan view of the side rod supports of the processing tool as shown in FIG. 8B with the one or more workpieces present on and in the side rod supports of the processing tool as shown in FIG. 8A and the cross-shape robot or transfer blade as shown in FIGS. 2A-2D between the side rod supports of the processing tool as shown in FIG. 8A, in accordance with some embodiments.

FIG. 13 is a top plan view of the side rod supports 502a-502d of the processing tool 502 as shown in FIG. 8B with the one or more workpieces (e.g., the workpieces 300 or the thin workpieces 302) present on the protrusions 506 and in the slots 504 side rod supports 502a-502d of the processing tool 502 as shown in FIG. 8A and the cross-shape robot or transfer blade 200 as shown in FIGS. 2A-2D between the side rod supports 502a-502d of the processing tool 502 as shown in FIG. 8A, in accordance with some embodiments.

Figure 14:
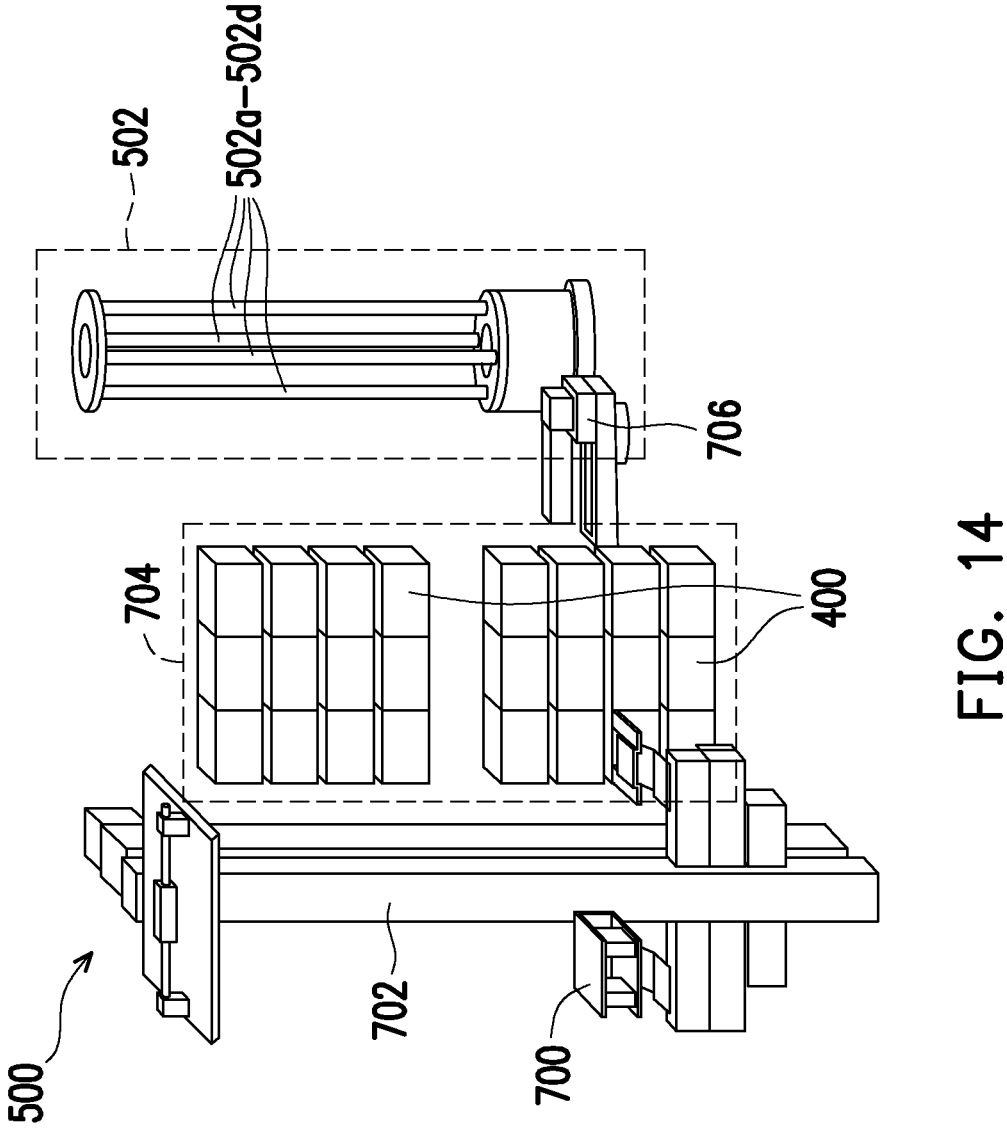
FIG. 14 is a perspective view of a processing tool or system in which the cross-shape robot or transfer blade as shown in FIGS. 2A-2D is present and utilized for supporting, transferring, and transporting a respective workpiece or a respective thin workpiece, in accordance with some embodiments.

FIG. 14 is a perspective view of a system 500 including the processing tool 502 with the plurality of side rod supports 502a-502d and one or more of the cassettes 400. The system 500 further includes a stage 700, a loader 702, a stocker 704, and a transfer arm robot (TRA) 706. The TRA 706 includes the cross-shape transfer blade 200 to prevent or reduce the likelihood of damaging the workpieces 300 or the thin workpieces 304 being transferred, transported, and supported by the transfer blade 200 to and from the cassette 400 and to and from the plurality of side rod supports 502a-502d. A respective cassette 400 may be loaded into the stocker 704 by placing the respective cassette 400 onto the stage 700. Once the respective cassette 400 is on the stage 700, the loader 702 loads the respective cassette 400, which contains either ones of the workpieces 300 or ones of the thin workpieces 304, into the stocker 704. Once the respective cassette 400 is loaded into the stocker 704, the TRA 706 utilizes and performs the method 600 as discussed earlier herein utilizing the cross-shape transfer blade 200 to load and unload the cassettes 400 within the stocker 704 and to load and unload the plurality of side rod supports 502a-502d.

Figure 15A:
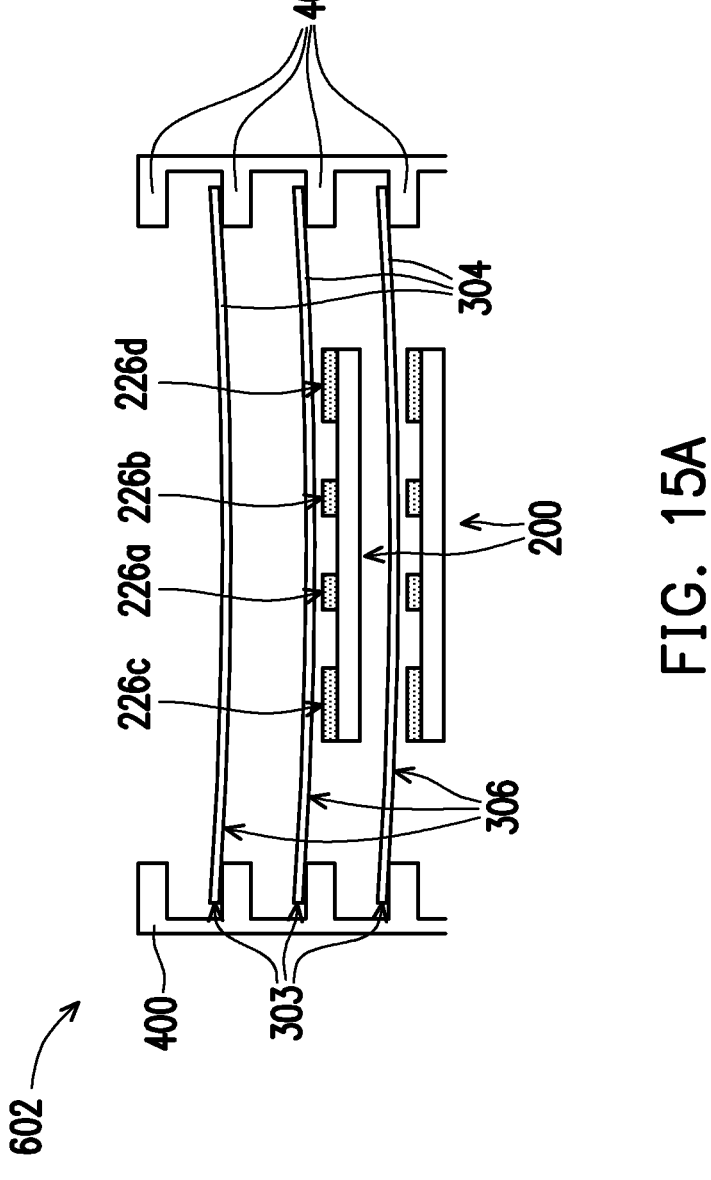
FIG. 15A is a front side view of the cassette in which multiple ones of the cross-shape transfer blades as shown in FIGS. 2A-2D are mounted to a TRA and the multiple transfer blades are inserted into the cassette to transport multiple workpieces present within the cassette, in accordance with some embodiments
Figure 15B:
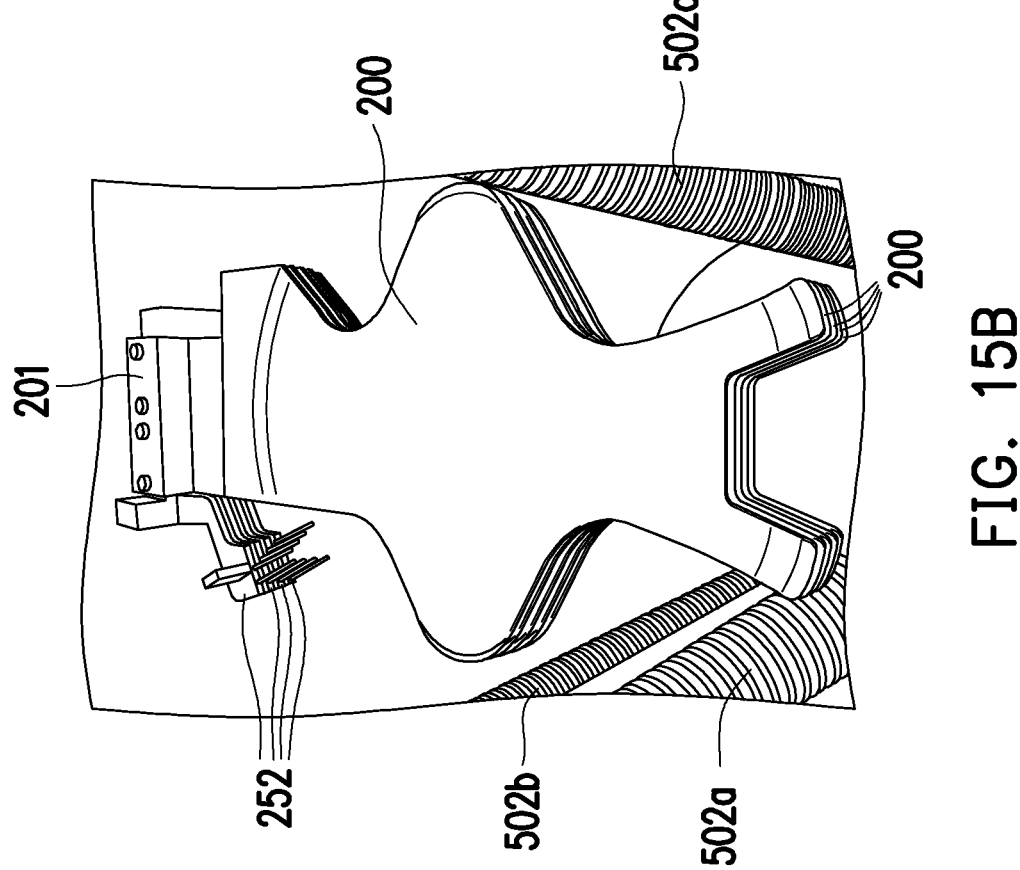
FIG. 15B is a perspective view in which multiple ones of the cross-shape transfer blade as shown in FIGS. 2A-2D are mounted to a TRA, in accordance with some embodiments.
Figure 15C:
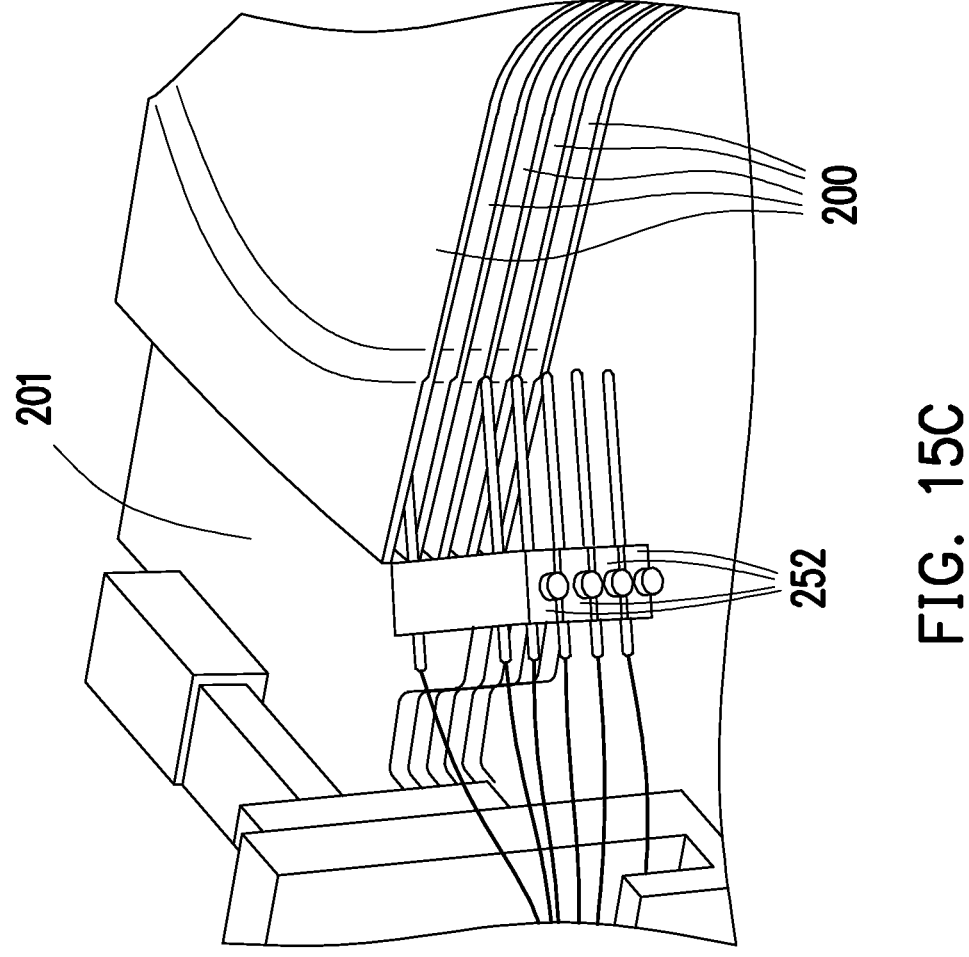
FIG. 15C is a zoomed in, perspective view in which multiple ones of the cross-shape transfer blade as shown in FIGS. 2A-2D are mounted to a TRA, in accordance with some embodiments.

FIG. 15 is a front side view of the cassette 400 in which multiple transfer blades 200 as shown in FIGS. 2A-2D, in accordance with some embodiments, are mounted to the TRA 706. The multiple transfer blades 200 are configured to be inserted into the cassette 400 or between the plurality of side rod supports 502-502d to remove and transport multiple workpieces (e.g., the workpieces 300 or the thin workpieces 304) at the same time to increase efficiency of the TRA 706 and increase efficiency in processing and refining the multiple workpieces (e.g., the workpieces 300 or the thin workpieces 304).

In view of the above discussion herein, the cross-shape transfer blade 200 prevents or reduces a likelihood of defects or damage propagating within respective workpieces (e.g., the workpiece 300 or the thin workpiece 304) being transferred, transported, or supported by the cross-shape transfer blade 200 between various locations as compared to the transfer blade 100. For example, the third and fourth raised regions 226c, 226d of the first and second wing structures 202, 204 and the larger sized fifth raised region 226e provide additional points of contact and support with and to a backside of a respective workpiece (e.g., the backside 302 of the workpiece 300 or the backside 306 of the thin workpiece 304) as compared to the transfer blade 100. In other words, these additional points of contact of the third and fourth raised regions 226c, 226d, which are spaced more outward from the central-line axis 218 than the first and second raised regions 226a, 226b, and the fifth raised region 226e provide greater stability and support as compared to the transfer blade 100. This greater stability of the cross-shape transfer blade 200 as compared to the transfer blade 100 prevents or reduces the likelihood of defects or damage to the backside 306 of the thin workpiece 304 as the thin workpiece 304 is substantially level or flat. This is because while the thin workpiece 304 is deformed or bent when on the transfer blade 100 (see FIGS. 7B and 7C of the present disclosure), the thin workpiece 304 is substantially level or flat when on the cross-shape transfer blade 200 instead.

In view of the above discussion herein, the cross-shape transfer blade 200 prevents or reduces a likelihood of defects or damage propagating within respective workpieces being transferred, transported, or supported by the cross-shape transfer blade 200 between various locations as compared to the transfer blade 100. For example, the fourth thickness T4 of the cross-shape transfer blade 200 being less than the second thickness T2 of the transfer blade 100 provides additional clearance space when positioning the cross-shape transfer blade 200 under a respective backside of a respective workpiece (e.g., the backside 302 of the workpiece 300 or the backside 306 of the thin workpiece 304) or when removing the cross-shape transfer blade 200 from below the respective backside of the respective workpiece (e.g., the backside 302 of the workpiece 300 or the backside 306 of the thin workpiece 304). This additional clearance space results in the plurality of raised regions 226a-226e being fully spaced apart and not in contact with the respective backside of the respective workpiece (e.g., the backside 302 of the workpiece 300 or the backside 306 of the thin workpiece 304) preventing defects or damage propagating as the plurality of raised regions 226a-226e is not in contact with the respective backside of the respective workpiece (e.g., the backside 302 of the workpiece 300 or the backside 306 of the thin workpiece 304) when removing the cross-shape transfer blade 200 from underneath the respective backside of the respective workpiece (e.g., the backside 302 of the workpiece 300 or the backside 306 of the thin workpiece 304) or positioning the cross-shape transfer blade 200 underneath the respective backside of the respective workpiece (e.g., the backside 302 of the workpiece 300 or the backside 306 of the thin workpiece 304).

In view of the above discussion, the cross-shape transfer blade 200 further prevents or reduces the likelihood of defects or damage propagating along respective surfaces or within respective workpieces (e.g., the workpiece 300 or the thin workpiece 304) as compared to the transfer blade 100. By further preventing or reducing this propagation of defects or damage along respective surface or within respective workpieces (e.g., the backside 302 of the workpiece 300 or the backside 306 of the thin workpiece 304) when utilizing the cross-shape transfer blade 200 instead of the transfer blade 100, the output by a semiconductor manufacturing plant (FAB) is increased and the amount of waste output by the FAB caused by the propagation of these defects or damage increases profits and reduces operating costs output and sustained by the FAB.

At least one embodiment of a transfer blade of the present disclosure may be summarized as including: a first end and a second end opposite to the first end; a first prong at the first end with a first raised region; a second prong at the first end with a second raised region; a gap that extends from the first prong to the second prong, the gap separates and spaces apart the first prong from the second prong; a first wing structure extending in a first direction, the first wing structure being between the first end and the second end, and the first wing structure including a third raised region; a second wing structure extending in a second direction opposite to the first direction, the second wing structure being between the first end and the second end, and the second wing structure including a fourth raised region; a mounting structure at the second end; a barrier structure between the mounting structure and the first and second wing structures; and a fifth raised region between the barrier structure and the first and second wing structures.

At least one embodiment of a system of the present disclosure may be summarized as including: a transfer robot arm (TRA); a transfer blade mounted to the transfer robot arm, the transfer blade including: a first end and a second end opposite to the first end; a first prong at the first end with a first raised region; a second prong at the first end with a second raised region; a gap that extends from the first prong to the second prong, the gap separates and spaces apart the first prong from the second prong; a first wing structure extending in a first direction, the first wing structure being between the first end and the second end, and the first wing structure including a third raised region; a second wing structure extending in a second direction opposite to the first direction, the second wing structure being between the first end and the second end, and the second wing structure including a fourth raised region; a mounting structure at the second end; a barrier structure between the mounting structure and the first and second wing structures; and a fifth raised region between the barrier structure and the first and second wing structures.

At least one embodiment of a method of the present disclosure may be summarized as including: positioning a transfer blade under a workpiece; raising the transfer blade to contact a backside of the workpiece with a first raised region, a second raised region, a third raised region, a fourth raised region, and a fifth raised region; and lifting the workpiece off one or more support structures by raising the transfer blade when the first, second, third, fourth, and fifth raised regions are in contact with the backside of the workpiece.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transfer blade, comprising:
a first end and a second end opposite to the first end;
a first prong at the first end with a first raised region;
a second prong at the first end with a second raised region;
a gap that extends from the first prong to the second prong, the gap separates and spaces apart the first prong from the second prong;
a first wing structure extending in a first direction, the first wing structure being between the first end and the second end, and the first wing structure including a third raised region;
a second wing structure extending in a second direction opposite to the first direction, the second wing structure being between the first end and the second end, and the second wing structure including a fourth raised region, and wherein the first wing structure and the second wing structure have a parabolic profile;
a mounting structure at the second end;

19 a barrier structure between the mounting structure and the first and second wing structures; and a fifth raised region between the barrier structure and the first and second wing structures.

2. The transfer blade of claim 1, wherein the first, second, third, fourth and fifth raised regions are configured to, in operation, contact a backside of a workpiece.

3. The transfer blade of claim 1, wherein:

the first prong includes a first hooked structure at a respective end of the first prong; and the second prong includes a second hooked structure at a respective end of the second prong.

4. The transfer blade of claim 1, wherein the third, fourth, and fifth raised regions are curved.

5. The transfer blade of claim 1, further comprising a first axis extending in a third direction perpendicular to the first and second directions, and wherein:

the first wing structure and the second wing structure are mirrored about the first axis; and the first prong and the second prong are mirrored about the first axis.

6. The transfer blade of claim 5, wherein the barrier structure is asymmetrical about the first axis.

7. The transfer blade of claim 1, further comprising:

a first dimension between a first point of the first prong furthest away from the second prong and a second point of the second prong furthest away from the first prong; and a second dimension between a third point of the first wing structure furthest away from the second wing structure and a fourth point of the second wing structure furthest away from the first wing structure, wherein the second dimension is greater than the first dimension.

8. The transfer blade of claim 1, further comprising a lower region that extends from the first and second raised regions to the fifth raised region and extends from the third raised region to the fourth raised region.

9. The transfer blade of claim 8, wherein the lower region extends continuously from the first and second raised regions to the fifth raised region and extends continuously from the third raised region to the fourth raised region.

10. A system, comprising:

a transfer robot arm (TRA); and a transfer blade mounted to the transfer robot arm, the transfer blade including:

a first end and a second end opposite to the first end;

a first prong at the first end with a first raised region;

a second prong at the first end with a second raised region;

a gap that extends from the first prong to the second prong, the gap separates and spaces apart the first prong from the second prong;

a first wing structure extending in a first direction, the first wing structure being between the first end and the second end, and the first wing structure including a third raised region;

a second wing structure extending in a second direction opposite to the first direction, the second wing structure being between the first end and the second end, and the second wing structure including a fourth raised region;

a mounting structure at the second end;

a barrier structure between the mounting structure and the first and second wing structures;

a fifth raised region between the barrier structure and the first and second wing structures; and

a first axis extending in a third direction perpendicular to the first and second directions, and wherein the first wing structure and the second wing structure are mirrored about the first axis, and the first prong and the second prong are mirrored about the first axis, and wherein the barrier structure is asymmetrical about the first axis.

11. The system of claim 10, wherein the first, second, third, fourth and fifth raised regions are configured to, in operation, contact a backside of a workpiece.

12. The system of claim 10, wherein:

the first prong includes a first hooked structure at a respective end of the first prong; and the second prong includes a second hooked structure at a respective end of the second prong.

13. The system of claim 10, wherein the third, fourth, and fifth raised regions are curved.

14. The system of claim 10, further comprising a sensor configured to, in operation, determine a presence of a respective workpiece on the transfer blade.

15. A method, comprising:

positioning a transfer blade under a workpiece, the transfer blade including:

a first end and a second end opposite to the first end;

a first prong at the first end with a first raised region;

a second prong at the first end with a second raised region;

a gap that extends from the first prong to the second prong, the gap separates and spaces apart the first prong from the second prong;

a first wing structure extending in a first direction, the first wing structure being between the first end and the second end, and the first wing structure including a third raised region; and a second wing structure extending in a second direction opposite to the first direction, the second wing structure being between the first end and the second end, and the second wing structure including a fourth raised region, and wherein the first wing structure and the second wing structure have a parabolic profile;

raising the transfer blade to contact a backside of the workpiece with the first raised region, the second raised region, the third raised region, and the fourth raised region; and lifting the workpiece off one or more support structures by raising the transfer blade when the first, second, third, and fourth, raised regions are in contact with the backside of the workpiece.

16. The method of claim 15, wherein the transfer blade further includes:

a fifth raised region closer to the second end than the first end.

17. The method of claim 16, wherein the third, fourth, and fifth raised regions are curved.

18. The method of claim 16, wherein:

raising the transfer blade to contact the backside of the workpiece with the first raised region, the second raised region, the third raised region, and the fourth raised region further includes contacting the backside of the workpiece with the fifth raised region; and lifting the workpiece off one or more support structure by raising the transfer blade when the first, second, third, and fourth raised regions are in contact with the backside of the workpiece further includes lifting the workpiece off one or more support structure by raising the transfer blade when the fifth raised region is in contact with the backside of the workpiece.

19. The method of claim 15, wherein:

the first prong includes a first hooked structure at a respective end of the first prong; and the second prong includes a second hooked structure at a respective end of the second prong.

20. The method of claim 19, wherein the raising the transfer blade to contact the backside of the workpiece with the first raised region, the second raised region, the third raised region, and the fourth raised region further includes positioning the first hooked structure and the second hooked structure in close proximity to an edge of the workpiece to retain the workpiece on the transfer blade.

\* \* \* \* \*